(12) United States Patent
Liu et al.

(10) Patent No.: US 11,751,195 B2
(45) Date of Patent: Sep. 5, 2023

(54) CONTROL SIGNALING FOR MULTICAST COMMUNICATIONS

(71) Applicant: QUALCOMM Incorporated, San Diego, CA (US)

(72) Inventors: Le Liu, Fremont, CA (US); Kazuki Takeda, Tokyo (JP); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 17/469,771

(22) Filed: Sep. 8, 2021

(65) Prior Publication Data

US 2022/0086883 A1   Mar. 17, 2022

Related U.S. Application Data

(60) Provisional application No. 63/078,122, filed on Sep. 14, 2020.

(51) Int. Cl.
*H04W 72/23* (2023.01)
*H04W 72/1273* (2023.01)
(Continued)

(52) U.S. Cl.
CPC ....... *H04W 72/1273* (2013.01); *H04W 24/08* (2013.01); *H04W 72/23* (2023.01);
(Continued)

(58) Field of Classification Search
None
See application file for complete search history.

(56) References Cited

U.S. PATENT DOCUMENTS

| 2019/0045495 A1* | 2/2019 | Chen | H04L 5/0044 |
| 2019/0149380 A1* | 5/2019 | Babaei | H04L 5/0091 |
| | | | 370/330 |

(Continued)

FOREIGN PATENT DOCUMENTS

WO   WO-2020221055 A1 *  11/2020

OTHER PUBLICATIONS

Machine Translation of WO2020/221055 (Year: 2022).*
(Continued)

*Primary Examiner* — Benjamin Lamont
(74) *Attorney, Agent, or Firm* — The Marbury Law Group

(57) ABSTRACT

In embodiments of systems and methods for managing control signaling for multicast communications, a base station may transmit to a wireless device an indication of whether to monitor a group common physical downlink control channel (GC PDCCH), a wireless device-specific PDCCH for multicast configuration information, or both. The base station may determine a schedule for transmitting multicast communications to the wireless device based on a capability reported by the wireless device, and may transmit to the wireless device an indication of whether a transport block for GC multicast communications including services for multicast communications will be scheduled by the GC PDCCH, the wireless device-specific PDCCH, or both. The base station may transmit, and the wireless device may receive, the multicast communications according to the multicast configuration information and the schedule.

38 Claims, 15 Drawing Sheets

(51) Int. Cl.
  *H04W 24/08* (2009.01)
  *H04W 72/30* (2023.01)
  *H04W 72/54* (2023.01)
  *H04W 72/566* (2023.01)

(52) U.S. Cl.
  CPC .......... *H04W 72/30* (2023.01); *H04W 72/54* (2023.01); *H04W 72/566* (2023.01)

(56) References Cited

U.S. PATENT DOCUMENTS

| | | | |
|---|---|---|---|
| 2019/0245648 A1* | 8/2019 | Jo | H04W 72/0446 |
| 2021/0337523 A1* | 10/2021 | Shen | H04L 5/0044 |
| 2022/0311577 A1* | 9/2022 | Matsumura | H04L 5/0048 |
| 2022/0322049 A1* | 10/2022 | Wang | H04W 4/06 |

OTHER PUBLICATIONS

CMCC: "Discussion on Group Scheduling Mechanisms in NR MBS", 3GPP Draft, 3GPP TSG RAN WG1 #102-e, R1-2006233, 3GPP, Mobile Competence Centre, Sophia-Antipolis Cedex, France, vol. RAN WG1, No. e-Meeting, Aug. 17, 2020-Aug. 28, 2020, Aug. 7, 2020, XP051915271, 9 Pages, Retrieved from the Internet: URL: https://ftp.3gpp.org/tsg_ran/WG1_RL1/TSGR1_102-e/Docs/R1-2006233.zip R1-2006233.docx [retrieved on Aug. 7, 2020] Figures 1, 2, Sections: 2.1, 2.2, p. 1-p. 4, Section: 2.3, p. 5-p. 6, Table 1, Section: 5, p. 8-p. 9. (9pages).

International Search Report and Written Opinion—PCT/US2021/049595—ISA/EPO—dated Jan. 4, 2022 15 pages.

Moderator (CMCC): "Summary#3 on NR Multicast and Broadcast Services", 3GPP Draft, 3GPP TSG RAN WG1 #102-e, R1-2007341, 3rd Generation Partnership Project (3GPP), Mobile Competence Centre, Sophia-Antipolis Cedex, France, vol. RAN WG1, No. e-Meeting, Aug. 17, 2020-Aug. 28, 2020, Aug. 29, 2020, XP051922973, pp. 1-68, Retrieved from the Internet: URL: https://ftp.3gpp.org/tsg_ran/WG1_RL1/TSGR1_102-e/Docs/R1-2007341.zip R1-2007341.docx [retrieved on Aug. 29, 2020].

ZTE: "Mechanisms to Support Group Scheduling for RRC_Connected UEs", 3GPP Draft, 3GPP TSG RAN WG1 Meeting #102-e, R1-2005436, 3GPP, Mobile Competence Centre, Sophia-Antipolis Cedex, France, vol. RAN WG1, No. e-Meeting, Aug. 17, 2020-Aug. 28, 2020, Aug. 8, 2020, XP051917461, pp. 1-7, Retrieved from the Internet: URL: https://ftp.3gpp.org/tsg_ran/WG1_RL1/TSGR1_102-e/Docs/R1-2005436.zip R1-2005436 Mechanisms to Support Group Scheduling for RRC_Connected UEs.docx [retrieved on Aug. 8, 2020].

* cited by examiner

500a

```
┌─────────────────────────────────────────────────────┐
│ Transmit To Wireless Device An Indication Of Whether To │
│ Monitor A Group Common Physical Downlink Control Channel │  502
│ (GC PDCCH), A Wireless Device-Specific PDCCH, Or Both The │
│ GC PDCCH And The Wireless Device-Specific PDCCH For │
│ Multicast Configuration Information │
└─────────────────────────────────────────────────────┘
                          ↓
┌─────────────────────────────────────────────────────┐
│ Determine A Schedule For Transmitting Multicast │  504
│ Communications To The Wireless Device Based On A Capability │
│ Reported By The Wireless Device │
└─────────────────────────────────────────────────────┘
                          ↓
┌─────────────────────────────────────────────────────┐
│ Transmit To The Wireless Device An Indication Of Whether The │  506
│ Multicast Communications Will Be Scheduled By The GC │
│ PDCCH, The Wireless Device-Specific PDCCH, Or Both The GC │
│ PDCCH And The Wireless Device-Specific PDCCH │
└─────────────────────────────────────────────────────┘
                          ↓
┌─────────────────────────────────────────────────────┐
│ Transmit To The Wireless Device The Multicast Communications │  508
│ According To The Multicast Configuration Information And │
│ The Schedule │
└─────────────────────────────────────────────────────┘
```

FIG. 5A

CONTROL SIGNALING FOR MULTICAST COMMUNICATIONS

RELATED APPLICATIONS

This application claims the benefit of priority to U.S. Provisional Patent Application No. 63/078,122 entitled "Control Signaling For Multicast Communications" filed Sep. 14, 2020, the entire contents of which are hereby incorporated by reference for all purposes.

BACKGROUND

Long Term Evolution (LTE) Fifth Generation (5G) New Radio (NR) systems utilize millimeter wave (mmWave) frequency bands to provide high bandwidth communication links. Point-to-multipoint communication services, such as multicast communication services, represent a high growth and high demand area for 5G systems. New systems of control signaling are needed to provide such multicast communication services.

SUMMARY

Various aspects include systems and methods performed by base stations of managing control signaling for multicast communications. Various aspects may include transmitting to a wireless device an indication of whether to monitor a group common physical downlink control channel (GC PDCCH), a wireless device-specific PDCCH, or both the GC PDCCH and the wireless device-specific PDCCH for multicast configuration information, determining a schedule for transmitting multicast communications to the wireless device based on a capability reported by the wireless device, transmitting to the wireless device an indication of whether a transport block for GC multicast communications including services for multicast communications-will be scheduled by the GC PDCCH, the wireless device-specific PDCCH, or both the GC PDCCH and the wireless device-specific PDCCH, and transmitting to the wireless device the multicast communications according to the multicast configuration information and the schedule.

In some aspects, transmitting to the wireless device an indication of whether to monitor the GC PDCCH, the wireless device-specific PDCCH, or both the GC PDCCH and the wireless device-specific PDCCH for multicast configuration information may include transmitting to the wireless device a Control Resource Set (CORESET) configuration indicating whether to enable monitoring of the GC PDCCH, the wireless device-specific PDCCH, or both the GC PDCCH and the wireless device-specific PDCCH.

In some aspects, transmitting to the wireless device an indication of whether to monitor the GC PDCCH, the wireless device-specific PDCCH, or both the GC PDCCH and the wireless device-specific PDCCH for multicast configuration information may include transmitting to the wireless device a Search Space (SS) configuration indicating whether to enable monitoring of the GC PDCCH, the wireless device-specific PDCCH, or both the GC PDCCH and the wireless device-specific PDCCH.

In some aspects, transmitting to the wireless device an SS configuration indicating whether to enable monitoring of the GC PDCCH, the wireless device-specific PDCCH, or both the GC PDCCH and the wireless device-specific PDCCH may include transmitting to the wireless device a common SS configuration indicating whether to enable monitoring of the GC PDCCH, the wireless device-specific PDCCH, or both the GC PDCCH and the wireless device-specific PDCCH.

In some aspects, transmitting to the wireless device an SS configuration indicating whether to enable monitoring of the GC PDCCH, the wireless device-specific PDCCH, or both the GC PDCCH and the wireless device-specific PDCCH may include transmitting to the wireless device a wireless device-specific SS configuration indicating whether to enable monitoring of the GC PDCCH, the wireless device-specific PDCCH, or both the GC PDCCH and the wireless device-specific PDCCH.

In some aspects, transmitting to the wireless device an indication of whether to monitor the GC PDCCH, the wireless device-specific PDCCH, or both the GC PDCCH and the wireless device-specific PDCCH for multicast configuration information may include transmitting to the wireless device a Downlink Control Information (DCI) format indicating whether to enable a Radio Network Temporary Identifier (RNTI) associated with the GC PDCCH, an RNTI associated with the wireless device-specific PDCCH, or both the RNTI associated with the GC PDCCH and the RNTI associated with the wireless device-specific PDCCH.

In some aspects, transmitting to the wireless device an indication of whether to monitor the GC PDCCH, the wireless device-specific PDCCH, or both the GC PDCCH and the wireless device-specific PDCCH for multicast configuration information may include transmitting to the wireless device a Channel Quality Indicator (CQI) threshold or a Signal-Plus-Interference-to-Noise Ratio (SINR) threshold to enable the wireless device to determine whether to monitor the GC PDCCH or the wireless device-specific PDCCH.

In some aspects, transmitting to the wireless device a CQI threshold or a SINR threshold to enable the wireless device to determine whether to monitor the GC PDCCH or the wireless device-specific PDCCH may include transmitting to the wireless device the CQI threshold or the SINR threshold to enable the wireless device to determine whether to enable an RNTI associated with the GC PDCCH or an RNTI associated with the wireless device-specific PDCCH. In some aspects, transmitting to the wireless device an indication of whether to monitor the GC PDCCH, the wireless device-specific PDCCH, or both the GC PDCCH and the wireless device-specific PDCCH for multicast configuration information may include transmitting to the wireless device a priority index to enable the wireless device to determine whether to monitor the GC PDCCH or the wireless device-specific PDCCH.

In some aspects, transmitting to the wireless device an indication of whether a transport block for GC multicast communications including services for multicast communications-will be scheduled by the GC PDCCH, the wireless device-specific PDCCH, or both the GC PDCCH and the wireless device-specific PDCCH may include transmitting the schedule to the wireless device by Radio Resource Control (RRC) signaling.

In some aspects, determining a schedule for transmitting multicast communications to the wireless device based on a capability reported by the wireless device may include determining based on the capability reported by the wireless device whether the wireless device is capable of receiving the schedule via the GC PDCCH, the wireless device-specific PDCCH, or both the GC PDCCH and the wireless device-specific PDCCH. In some aspects, determining based on the capability reported by the wireless device whether the wireless device is capable of receiving the schedule via the GC PDCCH, the wireless device-specific PDCCH, or both the GC PDCCH and the wireless device-specific PDCCH may include determining based on the capability reported by the wireless device whether the wireless device is capable of receiving multicast communications via the GC PDCCH or the wireless device-specific PDCCH in a same slot or overlapping in time.

In some aspects, transmitting to the wireless device an indication of whether a transport block for GC multicast communications including services for multicast communications will be scheduled by the GC PDCCH, the wireless device-specific PDCCH, or both the GC PDCCH and the wireless device-specific PDCCH may include transmitting to the wireless device a wireless device-specific PDCCH including a field to indicate whether the wireless device-specific PDCCH is associated with the GC PDCCH for multicast transmission. In some aspects, transmitting to the wireless device an indication of whether a transport block for GC multicast communications including services for multicast communications-will be scheduled by the GC PDCCH, the wireless device-specific PDCCH, or both the GC PDCCH and the wireless device-specific PDCCH may include transmitting to the wireless device an indication that the wireless device-specific PDCCH comprises a same Hybrid Automatic Retransmission Request (HARQ) process ID and a same New Data Indicator (NDI) as an associated GC PDCCH for multicast transmission.

Some aspects may include, in response to determining that the wireless device is capable of receiving the multicast scheduling information via both the GC PDCCH and the wireless device-specific PDCCH, transmitting to the wireless device an indication of whether multicast communications sent via a first physical downlink shared channel (PDSCH) that is scheduled by the wireless device-specific PDCCH and multicast communications sent via a second PDSCH that is scheduled by the GC PDCCH use the same resources and configuration.

In some aspects, transmitting to the wireless device an indication of whether multicast communications sent via the first PDSCH and multicast communications sent via the second PDSCH use the same resources and configuration may include transmitting to the wireless device an indication of whether multicast communications sent via the first PDSCH and multicast communications sent via the second PDSCH are transmitted in a same transport block (TB), wherein the multicast communications sent via the first PDSCH and the multicast communications sent via the second PDSCH have different redundancy versions (RVs).

Some aspects may include receiving feedback from the wireless device via an uplink resource indicated in the wireless device-specific PDCCH. Some aspects may include sending a retransmission of the multicast communications via the first PDSCH. Some aspects may include determining a PDCCH scheduling limitation on a number of GC PDCCHs, wireless device-specific PDCCHs, or GC PDCCHs and device-specific PDCCHs that may be scheduled in a same slot. In such aspects, transmitting to the wireless device the multicast communications according to the multicast configuration information and the schedule may include transmitting to the wireless device the multicast communications according to the determined PDCCH scheduling limitation.

Some aspects may include determining a PDSCH scheduling limitation on a number of PDSCHs scheduled by a GC PDCCH, PDSCHs scheduled by a wireless device-specific PDCCH, or PDSCHs scheduled by a GC PDCCH and a wireless device-specific PDCCH that may be scheduled in a same slot. In such aspects, transmitting to the wireless device the multicast communications according to the multicast configuration information and the schedule may include transmitting to the wireless device the multicast communications according to the determined PDSCH scheduling limitation.

Some aspects may include determining a TB scheduling limitation on a maximum data rate of TBs per slot transmitted in PDSCHs scheduled by a GC PDCCH, TBs per slot transmitted in PDSCHs scheduled by a wireless device-specific PDCCH, or TBs per slot transmitted in PDSCHs scheduled by a GC PDCCH(s) and wireless device-specific PDCCH(s) that may be scheduled in a same slot. In such aspects, transmitting to the wireless device the multicast communications according to the multicast configuration information and the schedule may include transmitting to the wireless device the multicast communications according to the determined TB scheduling limitation.

Further aspects include a base station computing device having a processor configured to perform one or more operations of any of the methods summarized above. Further aspects include a non-transitory processor-readable storage medium having stored thereon processor-executable instructions configured to cause a processor of a base station computing device to perform operations of any of the methods summarized above.

Various aspects include systems and methods performed by wireless devices of managing control signaling for multicast communications. Various aspects may include receiving from a base station an indication of whether to monitor a group common physical downlink control channel (GC PDCCH), a wireless device-specific PDCCH, or both the GC PDCCH and the wireless device-specific PDCCH for multicast configuration information, transmitting to the base station a capability of the wireless device to receive a schedule for multicast communication, receiving from the base station an indication of whether a transport block for GC multicast communications including services for multicast communications-will be scheduled by the GC PDCCH, the wireless device-specific PDCCH, or both the GC PDCCH and the wireless device-specific PDCCH, based on the capability of the wireless device, and receiving from the base station the multicast communications according to the multicast configuration information and the schedule.

In some aspects, receiving from the base station an indication of whether to monitor the GC PDCCH, the wireless device-specific PDCCH, or both the GC PDCCH and the wireless device-specific PDCCH for multicast configuration information may include receiving from the base station a Control Resource Set (CORESET) configuration indicating whether to enable monitor the GC PDCCH, the wireless device-specific PDCCH, or both the GC PDCCH and the wireless device-specific PDCCH.

In some aspects, receiving from the base station an indication of whether to monitor the GC PDCCH, the wireless device-specific PDCCH, or both the GC PDCCH and the wireless device-specific PDCCH for multicast configuration information may include receiving from the base station a Search Space (SS) configuration indicating whether to enable monitoring of the GC PDCCH, the wireless device-specific PDCCH, or both the GC PDCCH and the wireless device-specific PDCCH.

In some aspects, receiving from the base station a SS configuration indicating whether to enable monitoring of the GC PDCCH, the wireless device-specific PDCCH, or both the GC PDCCH and the wireless device-specific PDCCH may include receiving from the base station a common SS configuration indicating whether to enable monitoring of the GC PDCCH, the wireless device-specific PDCCH, or both the GC PDCCH and the wireless device-specific PDCCH.

In some aspects, receiving from the base station a SS configuration indicating whether to enable monitoring of the GC PDCCH, the wireless device-specific PDCCH, or both the GC PDCCH and the wireless device-specific PDCCH may include receiving from the base station a wireless device-specific SS configuration indicating whether to enable monitoring of the GC PDCCH, the wireless device-specific PDCCH, or both the GC PDCCH and the wireless device-specific PDCCH.

In some aspects, receiving from the base station an indication of whether to monitor the GC PDCCH, the wireless device-specific PDCCH, or both the GC PDCCH and the wireless device-specific PDCCH for multicast configuration information may include receiving from the base station a Downlink Control Information (DCI) format indicating whether to enable a Radio Network Temporary Identifier (RNTI) associated with the GC PDCCH, an RNTI associated with the wireless device-specific PDCCH, or both the RNTI associated with the GC PDCCH and the RNTI associated with the wireless device-specific PDCCH.

In some aspects, receiving from the base station an indication of whether to monitor the GC PDCCH, the wireless device-specific PDCCH, or both the GC PDCCH and the wireless device-specific PDCCH for multicast configuration information may include receiving from the base station a Channel Quality Indicator (CQI) threshold or a Signal-Plus-Interference-to-Noise Ratio (SINR) threshold, determining whether a CQI of a signal from the base station exceeds the CQI threshold or a SINR of a signal from the base station exceeds the SINR threshold, monitoring the GC PDCCH in response to determining that the CQI of the signal from the base station exceeds the CQI threshold or the SINR of the signal from the base station exceeds the SINR threshold, and monitoring the wireless device-specific PDCCH in response to determining that the CQI of the signal from the base station does not exceed the CQI threshold or the SINR of the signal from the base station does not exceed the SINR threshold.

In some aspects, monitoring the GC PDCCH may include enabling an RNTI associated with the GC PDCCH, and monitoring the wireless device-specific PDCCH may include enabling an RNTI associated with the wireless device-specific PDCCH. In some aspects, receiving from the base station an indication of whether to monitor the GC PDCCH, the wireless device-specific PDCCH, or both the GC PDCCH and the wireless device-specific PDCCH for multicast configuration information may include receiving from the base station a priority index, and determining based on the priority index and a priority associated with the GC PDCCH or the wireless device-specific PDCCH whether to monitor the GC PDCCH or the wireless device-specific PDCCH.

In some aspects, receiving from the base station an indication of whether to monitor the GC PDCCH, the wireless device-specific PDCCH, or both the GC PDCCH and the wireless device-specific PDCCH for multicast configuration information may include receiving from the base station a wireless device-specific PDCCH including a field indicating whether the wireless device-specific PDCCH is associated with the GC PDCCH for multicast transmission. In some aspects, receiving from the base station an indication of whether to monitor the GC PDCCH, the wireless device-specific PDCCH, or both the GC PDCCH and the wireless device-specific PDCCH for multicast configuration information may include receiving from the base station an indication that the wireless device-specific PDCCH comprises a same Hybrid Automatic Retransmission Request (HARQ) process ID and a same New Data Indicator (NDI) as an associated GC PDCCH for multicast transmission.

Some aspects may include receiving from the base station an indication of whether multicast communications sent via a first physical downlink shared channel (PDSCH) that is scheduled by the wireless device-specific PDCCH and multicast communications sent via a second PDSCH that is scheduled by the GC PDCCH use the same resources and configuration.

In some aspects, receiving from the base station an indication of whether multicast communications sent via the first PDSCH and multicast communications sent via a second PDSCH use the same resources and configuration may include receiving from the base station an indication of whether multicast communications sent via the first PDSCH and multicast communications sent via the second PDSCH are transmitted in a same transport block (TB), wherein the multicast communications sent via the first PDSCH and the multicast communications sent via the second PDSCH have different redundancy versions (RVs).

Some aspects may include sending feedback to the base station via an uplink resource indicated in the wireless device-specific PDCCH. Some aspects may include receiving a retransmission of the multicast communications via the first PDSCH. In some aspects, receiving from the base station the multicast communications according to the multicast configuration information and the schedule may include receiving from the base station the multicast communications according to a PDCCH limitation on a number of GC PDCCHs, wireless device-specific PDCCHs, or GC PDCCHs and device-specific PDCCHs that may be scheduled in a same slot, wherein the PDCCH limitation is based on the capability of the wireless device.

In some aspects, receiving from the base station the multicast communications according to the multicast configuration information and the schedule may include receiving from the base station the multicast communications according to a PDSCH scheduling limitation on a number of PDSCHs scheduled by a GC PDCCH, PDSCHs scheduled by a wireless device-specific PDCCH, or PDSCHs scheduled by a GC PDCCH(s) and wireless device-specific PDCCHs that may be scheduled in a same slot, wherein the PDSCH scheduling limitation is based on the capability of the wireless device.

In some aspects, receiving from the base station the multicast communications according to the multicast configuration information and the schedule may include receiving from the base station the multicast communications according to a TB scheduling limitation on a maximum data rate of TBs per slot transmitted in PDSCHs scheduled by a GC PDCCH, TBs per slot transmitted in PDSCHs scheduled by a wireless device-specific PDCCH, or TBs per slot transmitted in PDSCHs scheduled by a GC PDCCH(s) and wireless device-specific PDCCH(s) that may be scheduled in a same slot, wherein the TB scheduling limitation is based on the capability of the wireless device.

Further aspects include a wireless device having a processor configured to perform one or more operations of any of the methods summarized above. Further aspects include processing devices for use in a wireless device configured with processor-executable instructions to perform operations of any of the methods summarized above. Further aspects include a non-transitory processor-readable storage medium having stored thereon processor-executable instructions configured to cause a processor of a wireless device to perform operations of any of the methods summarized above. Further aspects include a wireless device having means for performing functions of any of the methods summarized above. Further aspects include a system on chip for use in a wireless device and that includes a processor configured to perform one or more operations of any of the methods summarized above.

BRIEF DESCRIPTION OF THE DRAWINGS

FIG. 5A is a process flow diagram illustrating a method performed by a processor of a base station device for managing control signaling for multicast communications according to various embodiments

DETAILED DESCRIPTION

Figure 1:
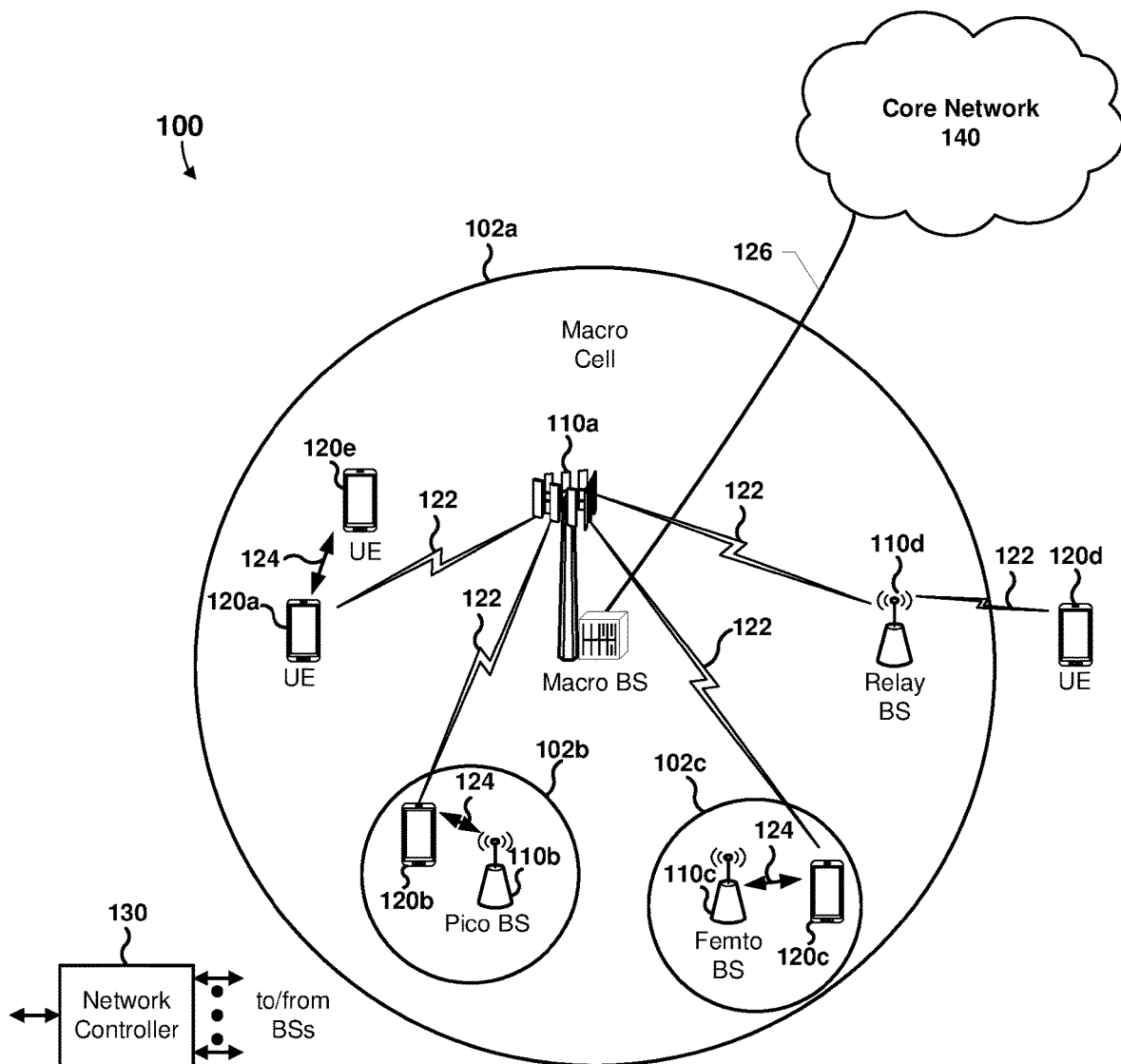
FIG. 1 is a system block diagram illustrating an example communications system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include systems and methods for managing communication between a wireless device and a base station for enhancing control signaling for multicast communications. In various embodiments, a base station may send information to a wireless device to enable the wireless device to locate and receive control signaling, which enables the wireless device to locate and receive multicast data communications. The wireless device may receive information that enables the wireless device to locate and receive multicast control signaling from the base station. The wireless device may use information in the control signaling to locate and receive multicast data communications.

Thus, various embodiments enable the base station to send and the wireless device to receive control signaling needed to provide multicast communication services efficiently and accurately.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), IEEE 802.11 (WiFi), IEEE 802.16 (WiMAX), Institute of Electrical and Electronics Engineers (IEEE) 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3 G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

Point-to-multipoint communication services, such as multicast communication services, represent a high growth and high demand area for 5G systems. New systems of control signaling are needed to provide such multicast communication services. Options exist for scheduling multicast/broadcast services (sometimes referred to as MBS) data for wireless devices operating in a Radio Resource Control (RRC) Connected mode. In a first option, a mobile broadcast service (MBS) system may use a GC PDCCH with a Cyclic Redundancy Check (CRC) code scrambled by a common identifier, such as a group Radio Network Temporary Identifier (G-RNTI), to schedule a PDSCH that is common for a group of wireless devices for transmission of MBS data. In a second option, the MBS system may use a wireless device-specific PDCCH with a CRC scrambled by a wireless device-specific RNTI (such as a Cell-RNTI (C-RNTI), a modulation and coding scheme C-RNTI (MCS-C-RNTI), or another suitable identifier) to schedule a PDSCH that is wireless device-specific or common for a group of wireless device for transmission of MBS data. Content may include MBS transport blocks.

For the first option, both the PDCCH and the PDSCH may be shared among a group of wireless devices. For a GC PDSCH, resource allocation may be limited within common frequency resource(s) in downlink (DL) active bandwidth part (BWP) of the group of wireless devices. A scrambling sequence of the PDSCH may be associated with the G-RNTI, common for the group of wireless devices as well. For a GC PDCCH, the associated CORESET should also be within the common frequency resource(s).

In the second option, for a wireless device-specific PDCCH, the CORSET may be within the wireless device's active BWP and not necessarily limited to the common frequency resource (or resources) in DL active BWP of a group of wireless devices. The PDSCH scheduled by device-specific PDCCH may be wireless device-specific data or MBS data. In some embodiments, the scrambling sequence of the PDSCH with device-specific data may be associated with the C-RNTI. In some embodiments, the scrambling sequence of the PDSCH with MBS data may be indicated to be associated with the C-RNTI or G-RNTI, e.g., explicitly by Downlink Control Information (DCI) (for example, by a DCI format) or implicitly by using a different PDCCH scrambling sequence.

In various embodiments, an MBS system may be configured to select among or control the enablement of options such as the first option and the second option described above. Further, the MBS system may be configured to provide control signaling and other information via a group common physical downlink control channel (GC PDCCH) and a wireless device-specific PDCCH in the case in which both the first option and the second option (and/or other options) are supported (e.g., by a wireless device).

Various embodiments include systems and methods for managing control signaling for multicast communications. In various embodiments, a base station may send information to a wireless device to enable the wireless device to locate and receive control signaling, which enables the wireless device to locate and receive multicast data communications. The wireless device may receive information that enables the wireless device to locate and receive multicast control signaling from the base station. The wireless device may use information in the control signaling to locate and receive multicast data communications.

In some embodiments, the base station may transmit to a wireless device an indication of whether to monitor a GC PDCCH, a wireless device-specific PDCCH for multicast configuration information, or both the GC PDCCH and the wireless device-specific PDCCH for multicast configuration information. The base station may determine a schedule for transmitting multicast communications to the wireless device based on a capability reported by the wireless device. In some embodiments, the base station may determine whether to enable (e.g., via control signaling) the wireless device to receive multicast scheduling information based on the capability information received (e.g., in a report or another transmission) from the wireless device. In some embodiments, the base station may determine based on the capability reported by the wireless device whether the wireless device is capable of receiving the schedule via the GC PDCCH, the wireless device-specific PDCCH, or both the GC PDCCH and the wireless device-specific PDCCH. The base station may transmit to the wireless device an indication of whether multicast communications will be scheduled by the GC PDCCH, the wireless device-specific PDCCH, or both the GC PDCCH and the wireless device-specific PDCCH. In some embodiments, the base station may transmit the schedule to the wireless device via, for example, RRC signaling. The base station may then transmit to the wireless device the multicast communications according to the multicast configuration information and the schedule.

In various embodiments, the base station may indicate to the wireless device where to monitor for multicast downlink control signaling. In some embodiments, the base station may transmit to the wireless device a Control Resource Set (CORESET) configuration indicating whether to enable monitoring of the GC PDCCH, the wireless device-specific PDCCH, or both the GC PDCCH and the wireless device-specific PDCCH. In some embodiments, the base station may configure via RRC signaling whether to enable a wireless device-specific PDCCH and/or a GC PDCCH for multicast services per CORESET. In some embodiments, the base station may configure whether to enable (or disable) a wireless device-specific PDCCH and/or a GC PDCCH for multicast services via a DCI (e.g., a DCI format) or a Media Access Control-Control Element (MAC-CE) even if both the wireless device-specific PDCCH and the GC PDCCH are enabled by RRC signaling.

In some embodiments, the base station may transmit to the wireless device a Search Space (SS) configuration indicating whether to monitor the GC PDCCH, the wireless device-specific PDCCH, or both the GC PDCCH and the wireless device-specific PDCCH. In some embodiments, the base station may configure whether to enable a wireless device-specific PDCCH and/or a GC PDCCH for multicast services per SS via RRC signaling. In some embodiments, the base station may transmit a Common SS (CSS) configuration indicating whether to enable monitoring of the GC PDCCH and/or the wireless device-specific PDCCH. In some embodiments, the base station may transmit a wireless device (e.g. UE)-specific SS (USS) configuration indicating whether to enable monitoring the GC PDCCH and/or the wireless device-specific PDCCH. In some embodiments, the base station may configure whether to enable a wireless device-specific PDCCH and/or a GC PDCCH for multicast services via a DCI (e.g., a DCI format) or a MAC-CE even if both wireless device-specific PDCCH and GC PDCCH are enabled by RRC signaling. In some embodiments, the base station may configure the CSS and USS independently to indicate whether to monitor the GC PDCCH or the wireless device-specific PDCCH.

In some embodiments, the base station may transmit to the wireless device the configuration of a DCI format indicating whether to monitor the GC PDCCH or the wireless device-specific PDCCH. In some embodiments, a DCI format may be used to indicate a wireless device-specific PDCCH to schedule multicast data (e.g., DCI format 1_1 and/or DCI format 1_2). In some embodiments, DCI format 1_0, 1_1, and/or 1_2 may be used to indicate GC PDCCH to schedule multicast data.

In some embodiments, the base station may determine whether the wireless device is enabled to receive the schedule (e.g., multicast scheduling information) via the GC PDCCH, the wireless device-specific PDCCH, or both the GC PDCCH and the wireless device-specific PDCCH. For example, the base station may send RRC signaling (e.g., a CORESET, SS, or DCI format) or other control signaling with a configuration related to the GC PDCCH and/or wireless device-specific PDCCH. In some embodiments, in response to determining that the wireless device is enabled (e.g., via the RRC signaling or other control signaling from the base station) to receive the multicast scheduling information via both the GC PDCCH and the wireless device-specific PDCCH, the base station may transmit to the wireless device an indication of whether multicast communications sent via a first physical downlink shared channel (PDSCH) that is scheduled by the wireless device-specific PDCCH and multicast communications sent via a second PDSCH that is scheduled by the GC PDCCH may use the same resources and configuration. In some embodiments, the first PDSCH scheduled by device-specific PDCCH may be same as the second PDSCH scheduled by GC-PDSCH. In such embodiments, the PDSCH may be common for a group of wireless devices. In some embodiments, the PDSCH may be wireless device-specific.

In some embodiments, in response to determining that the wireless device is capable of receiving the multicast schedule via both the GC PDCCH and the wireless device-specific PDCCH, the base station may indicate to the wireless device that the wireless device may use a wireless device-specific physical uplink control channel (PUCCH) resource for transmitting feedback, such as Hybrid Automatic Retransmission Request (HARQ) acknowledgements or feedback (e.g., a HARQ ACK). In such embodiments, if the first PDSCH and second PDSCH use the same resources and configuration, the wireless device may transmit HARQ ACK feedback using an uplink resource configuration such as indicated in the wireless device-specific PDCCH (e.g., a wireless device-specific PUCCH and Transmit Power Control (TPC) command indicated in the wireless device-specific PDCCH). The wireless device may do this instead of using an uplink resource configuration indicated in the GC PDCCH, thereby overriding group uplink channel resources indicated in the GC PDCCH.

In some embodiments, in response to determining that the wireless device is capable of receiving the multicast schedule via both the GC PDCCH and the wireless device-specific PDCCH, the base station may send a retransmission of multicast communications (e.g., a HARQ retransmission) via the first PDSCH rather than via the second PDSCH. In some embodiments, in response to determining that the wireless device is capable of receiving the multicast scheduling information via both the GC PDCCH and the wireless device-specific PDCCH, the base station may transmit to the wireless device an indication that a retransmission of the multicast communications will be sent via the first PDSCH. In some embodiments, the base station may send to the wireless device an indication that the retransmission will be sent via the same transport block (TB) but having a different redundancy version (RV) to enable the wireless device to identify the retransmitted multicast communications. In some embodiments, the wireless device may determine an association between multicast communications and retransmitted multicast communications based on a HARQ process ID, which the base station may indicate in a PDCCH message. In some embodiments, if the first PDSCH and the second PDSCH carry the same TB associated with a configured HARQ process ID pair, the wireless device may combine the multicast communications received via the first PDSCH and the second PDSCH, and may determine the HARQ ACK feedback using the uplink resource configuration indicated in the wireless device-specific PDCCH, or GC PDCCH, or the latest PDCCH received by wireless device.

In various embodiments, the wireless device may receive from the base station an indication of whether to monitor a group common physical downlink control channel (GC PDCCH) or a wireless device-specific PDCCH for multicast configuration information. The wireless device may transmit to the base station a capability of the wireless device to receive multicast scheduling information, and based on the capability of the wireless device the wireless device may receive receiving from the base station an indication of whether multicast communications will be scheduled by the GC PDCCH, the wireless device-specific PDCCH, or both the GC PDCCH and the wireless device-specific PDCCH. The wireless device may then receive from the base station the multicast communications according to the multicast configuration information and the multicast scheduling information.

In some embodiments, the wireless device may receive from the base station a CORESET indicating whether to monitor the GC PDCCH or the wireless device-specific PDCCH. In some embodiments, the wireless device may receive from the base station an SS indicating whether to monitor the GC PDCCH or the wireless device-specific PDCCH. In some embodiments, the wireless device may receive from the base station a DCI indicating whether to monitor the GC PDCCH or the wireless device-specific PDCCH. In some embodiments, the wireless device may prioritize a CORESET having a lowest index to prioritize PDCCH monitoring configured per CORESET.

In some embodiments, the wireless device may transmit an indication of whether the wireless device is enabled to receive the multicast scheduling information via the GC PDCCH, the wireless device-specific PDCCH, or both the GC PDCCH and the wireless device-specific PDCCH. In such embodiments, the wireless device may receive from the base station an indication of whether multicast communications sent via a first PDSCH that is scheduled by the wireless device-specific PDCCH and multicast communications sent via a second PDSCH that is scheduled by the GC PDCCH use the same resources and configuration.

In some embodiments, the base station may transmit to the wireless additional criteria, such as channel quality index (CQI) or signal-plus-interference-to-noise ratio (SINR), to enable the wireless device to determine whether to enable or select a GC PDCCH or wireless device-specific PDCCH for multicast communications. For example, the base station may indicate a CQI threshold or a SINR threshold to the wireless device. In response to determining that a CQI or a SINR of a signal from the base station is greater than the respective CQI or SINR threshold, the wireless device may monitor the GC PDCCH. In response to determining that the CQI or SINR of the signal from the base station is does not exceed the respective CQI or SINR threshold; the wireless device may monitor the wireless device-specific PDCCH. In some embodiments, monitoring the GC PDCCH may include enabling an RNTI associated with the GC PDCCH, and monitoring the wireless device-specific PDCCH may include enabling an RNTI associated with the wireless device-specific PDCCH.

In some embodiments, the base station may transmit to the wireless additional criteria based on priority index, to enable the wireless device to determine whether to enable or select a GC PDCCH or wireless device-specific PDCCH for multicast communications. For example, the base station may indicate a priority index by RRC signaling or DCI to the wireless device. In some embodiments, based on the priority index, the wireless device may monitor a GC PDCCH or device-specific PDCCH associated with a high priority (e.g., a priority index of 1). In some embodiments, based on the priority index, the wireless device may not monitor a GC PDCCH or device-specific PDCCH associated with a low priority (e.g., priority index of 0). In some embodiments, the base station may configure the priority index by RRC signaling or DCI differently per RNTI associated with the GC-PDCCH. In some embodiments, the base station may configure the priority index based on a CORESET ID. As noted above, based on the capability reported by the wireless device, the base station may determine whether the wireless device is capable of receiving the schedule via the GC PDCCH, the wireless device-specific PDCCH, or both the GC PDCCH and the wireless device-specific PDCCH. In some embodiments, based on the capability reported by the wireless device, the base station may determine whether the wireless device is capable of receiving multicast communications via the GC PDCCH or the wireless device-specific PDCCH in a same slot or overlapping in time. In some embodiments, the base station may transmit to the wireless device a wireless device-specific PDCCH including a field indicating whether the wireless device-specific PDCCH is associated with the GC PDCCH for multicast transmission. In some embodiments, the base station may transmit to the wireless device an indication that the wireless device-specific PDCCH includes a same Hybrid Automatic Retransmission Request (HARQ) process ID and a same New Data Indicator (NDI) as an associated GC PDCCH for multicast transmission.

In some embodiments, based on the capability of the wireless device, the base station may provide different configurations of PDCCH monitoring per group-common RNTI for different multicast services.

In some embodiments, the base station may limit a number of PDCCHs, PDSCHs, and/or transport blocks (TBs) that the base station schedules for and/or transmits to the wireless device. In some embodiments, the base station may base such limitation(s) on the capability of the wireless device. In some embodiments, such limitations may be predefined. In some technical standards, this concept may be expressed as, for example, "the wireless device may not be expected to receive more than a specified number of PDCCHs, PDSCHs, and/or transport blocks (TBs) in same slot."

In some embodiments, the wireless device may not be capable of receiving more than a specified number of group-common PDCCH(s) in same slot. In some embodiments, the wireless device may not be capable of receiving more than a specified number of wireless device-specific PDCCH(s) in same slot. In some embodiments, the wireless device may not be capable of receiving more than a specified number of group-common PDCCH(s), or more than a specified number of wireless device-specific PDCCH(s), or more than a specified total number of GC PDCCH(s) and device-specific PDCCH(s) in same slot. In some embodiments, the wireless device may not be capable of receiving more than a specified number of the PDSCH(s) scheduled by one or more group-common PDCCHs. In some embodiments, the wireless device may not be capable of receiving more than a specified number of the PDSCH(s) scheduled by one or more wireless device-specific PDCCHs overlapping at the same time. In some embodiments, the wireless device may not be capable of receiving more than a specified total number of the PDSCH(s) scheduled by one or more wireless device-specific PDCCHs and/or one or more GC PDCCHs. In some embodiments, the wireless device may not be capable of receiving more than a specified number (or data rate) of TB(s) transmitted in the PDSCHs scheduled by one or more group-common PDCCHs. In some embodiments, the wireless device may not be capable of receiving more than a specified number (or data rate) of TB(s) transmitted in the PDSCH(s) scheduled by one or more wireless device-specific PDCCHs overlapping at the same time. In some embodiments, the wireless device may not be capable of receiving more than a specified total number (or data rate) of TB(s) transmitted in the PDSCH(s) scheduled by one or more wireless device-specific PDCCHs and/or one or more GC PDCCHs.

In some embodiments, the base station may limit the number of PDCCHs, PDSCHs, and/or transport blocks (TBs) that the base station schedules for and/or transmits to the wireless device. In some embodiments, the base station may determine a PDCCH scheduling limitation on a number of GC PDCCHs, wireless device-specific PDCCHs, or GC PDCCHs and device-specific PDCCHs that may be scheduled in a same slot, and may transmit to the wireless device the multicast communications according to the determined PDCCH scheduling limitation. In some embodiments, the base station may determine a PDSCH scheduling limitation on a number of PDSCHs scheduled by a GC PDCCH, PDSCHs scheduled by a wireless device-specific PDCCH, or PDSCHs scheduled by a GC PDCCH and a wireless device-specific PDCCH that may be scheduled in a same slot, and may transmit to the wireless device the multicast communications according to the determined PDSCH scheduling limitation. In some embodiments, the base station may determine a TB scheduling limitation on a maximum data rate of TBs per slot transmitted in PDSCHs scheduled by a GC PDCCH, TBs per slot transmitted in PDSCHs scheduled by a wireless device-specific PDCCH, or TBs per slot transmitted in PDSCHs scheduled by a GC PDCCH(s) and wireless device-specific PDCCH(s) that may be scheduled in a same slot, and may transmit to the wireless device the multicast communications according to the determined TB scheduling limitation.

In this manner, various embodiments enable the base station to send and the wireless device to receive control signaling needed to provide multicast communication services efficiently and accurately.

FIG. 1 is a system block diagram illustrating an example communications system 100. The communications system 100 may be a 5G New Radio (NR) network, or any other suitable network such as a Long Term Evolution (LTE) network. While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of wireless devices (illustrated as wireless devices 120a-120e in FIG. 1). The communications system 100 also may include a number of base stations (illustrated as the BS 110a, the BS 110b, the BS 110c, and the BS 110d) and other network entities. A base station is an entity that communicates with wireless devices, and also may be referred to as a Node B, an LTE Evolved nodeB (eNodeB or eNB), an access point (AP), a Radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. The core network 140 may be any type core network, such as an LTE core network (e.g., an EPC network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by wireless devices with service subscription. A pico cell may cover a relatively small geographic area and may allow unrestricted access by wireless devices with service subscription. A femto cell may cover a relatively small geographic area (for example, a home) and may allow restricted access by wireless devices having association with the femto cell (for example, wireless devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay BS 110d). A relay station is an entity that can receive a transmission of data from an upstream station (for example, a base station or a wireless device) and send a transmission of the data to a downstream station (for example, a wireless device or a base station). A relay station also may be a wireless device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, user equipment (UE), etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 subcarriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to 2 streams per wireless device may be supported.

Aggregation of multiple cells may be supported with up to eight serving cells. Alternatively, NR may support a different air interface, other than an OFDM-based air interface.

Some wireless devices may be considered machine-type communication (MTC) or evolved or enhanced machine-type communication (eMTC) wireless devices. MTC and eMTC wireless devices include, for example, robots, drones, remote devices, sensors, meters, monitors, location tags, etc., that may communicate with a base station, another device (for example, remote device), or some other entity. A wireless computing platform may provide, for example, connectivity for or to a network (for example, a wide area network such as Internet or a cellular network) via a wired or wireless communication link. Some wireless devices may be considered Internet-of-Things (IoT) devices or may be implemented as NB-IoT (narrowband internet of things) devices. The wireless device 120a-120e may be included inside a housing that houses components of the wireless device 120a-120e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some implementations, two or more wireless devices (for example, illustrated as the wireless device 120a and the wireless device 120e) may communicate directly using one or more sidelink channels (for example, without using a base station 110a-d as an intermediary to communicate with one another). For example, the wireless devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-120e may perform scheduling operations, resource selection operations, as well as other operations described elsewhere herein as being performed by the base station 110a-110d.

Figure 2:
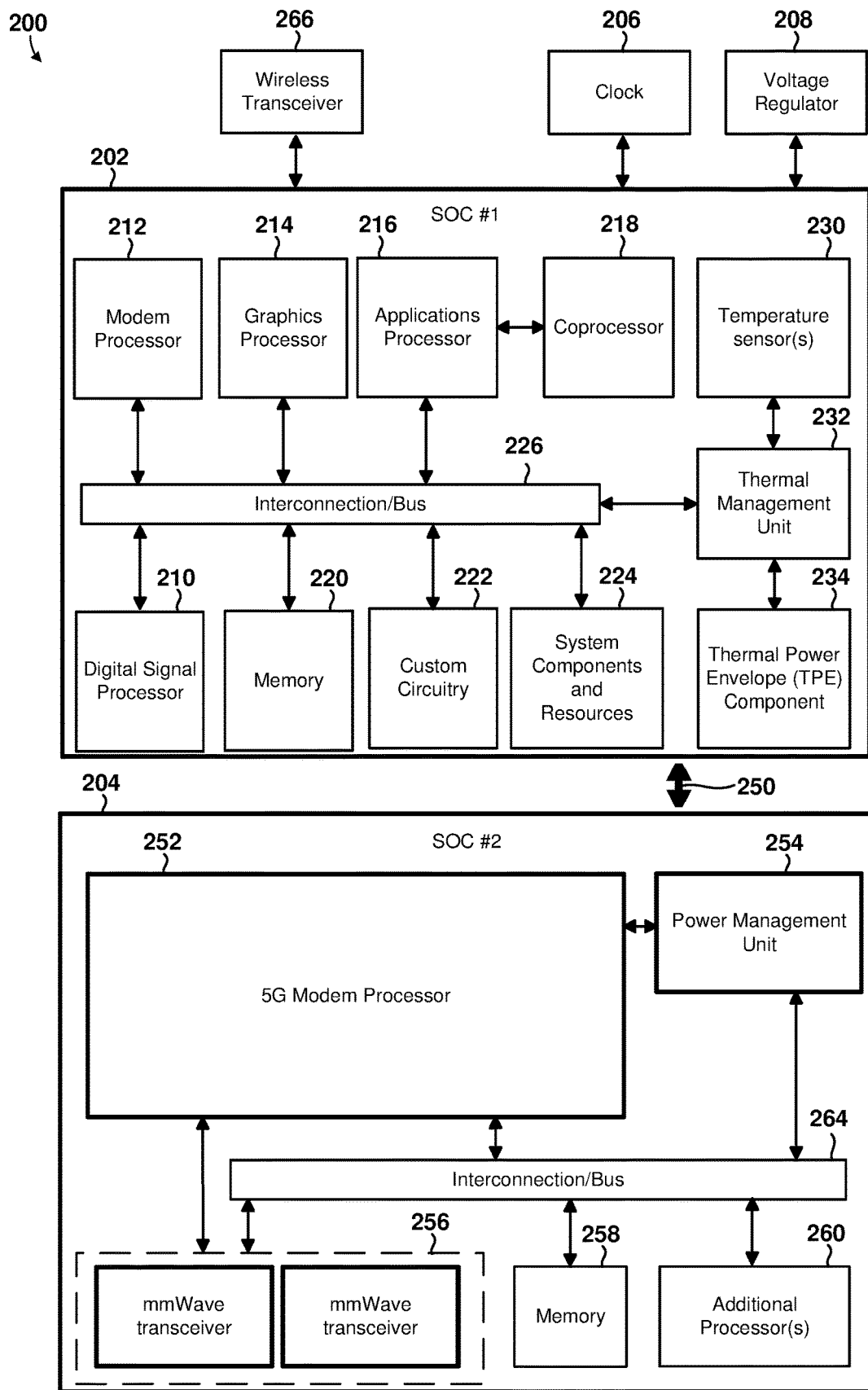
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from wireless devices, such as a base station 110a. In some implementations, the first SOC 202 may operate as central processing unit (CPU) of the wireless device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wave length (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 3:
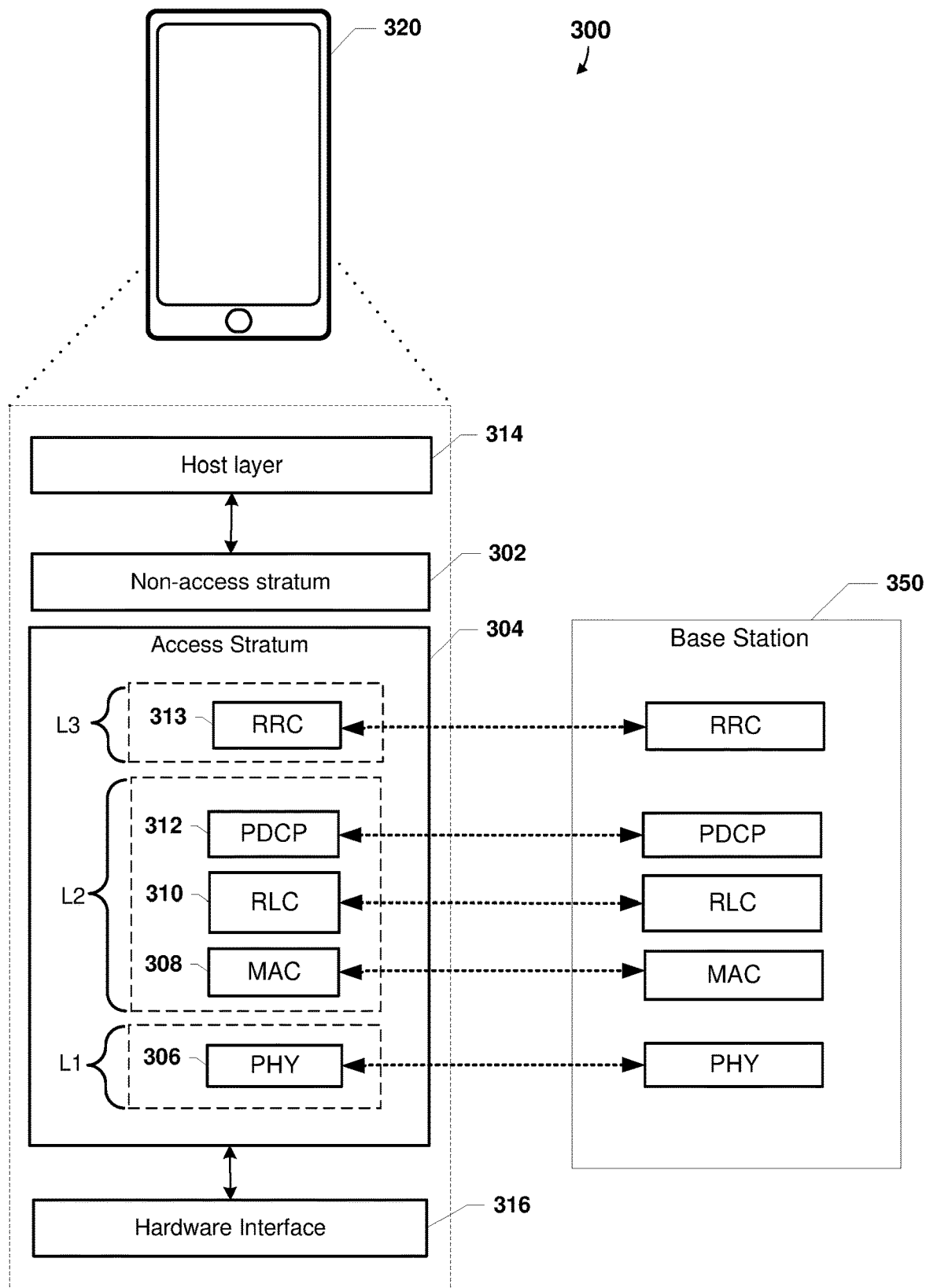
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and the base station 350 (e.g., the base station 110a-110d) of a communication system (e.g., 100).

In various embodiments, layers in a software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (such as SIM(s) 204) and its core network 140. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface via a wireless transceiver (e.g., 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In some implementations, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some implementations, the RRC sublayer 313 may provide functions including broadcasting system information, paging, and establishing and releasing an RRC signaling connection between the wireless device 320 and the base station 350.

In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some implementations, application-specific functions provided by the at least one host layer 314 may provide an interface between the software architecture and the general purpose processor 206.

In other implementations, the software architecture 300 may include one or more higher logical layer (such as transport, session, presentation, application, etc.) that provide host layer functions. For example, in some implementations, the software architecture 300 may include a network layer (such as Internet protocol (IP) layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

Figure 4A:
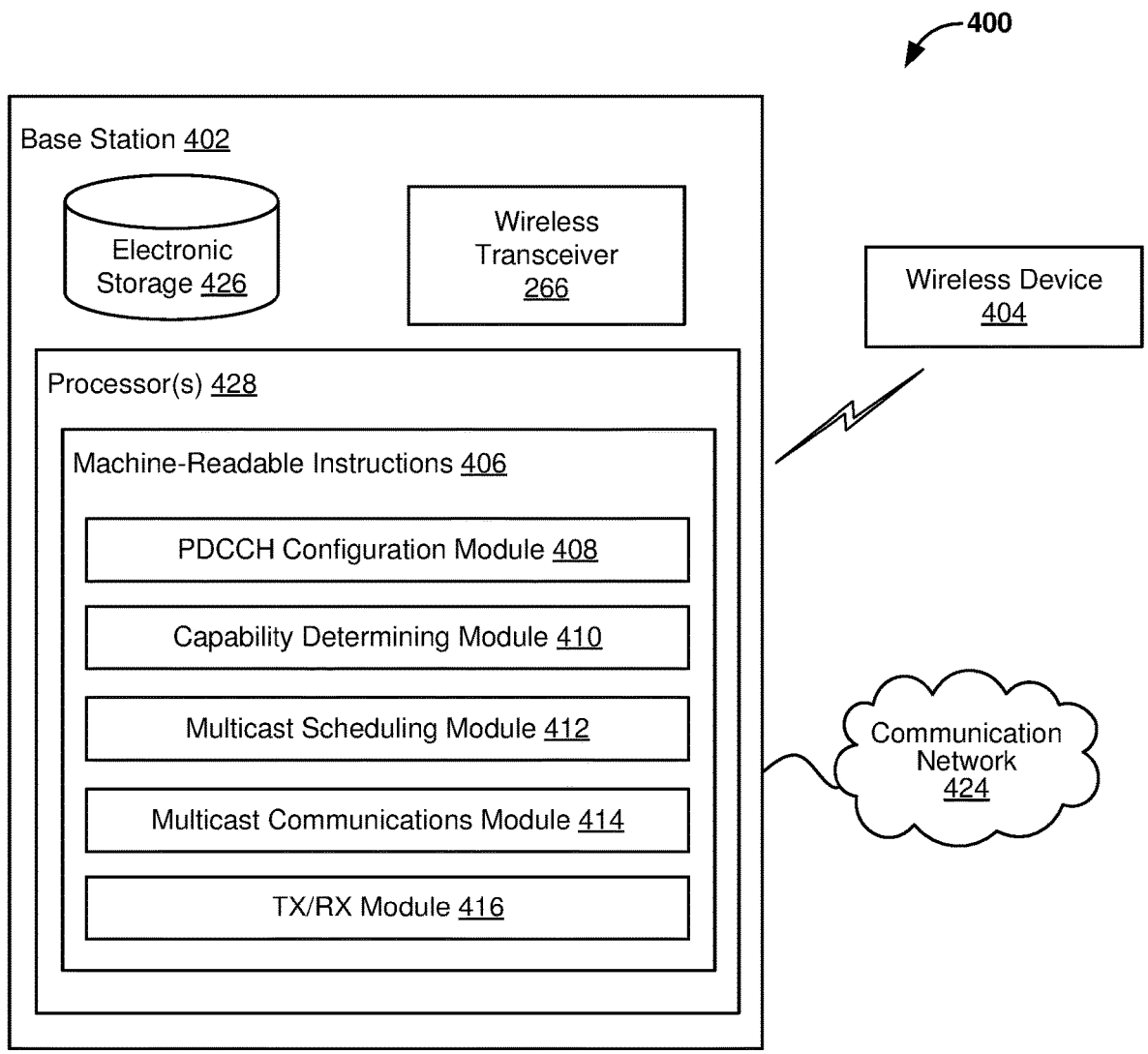
FIG. 4A is a component block diagram illustrating components and processing modules of a base station suitable for use with various embodiments.
Figure 4B:
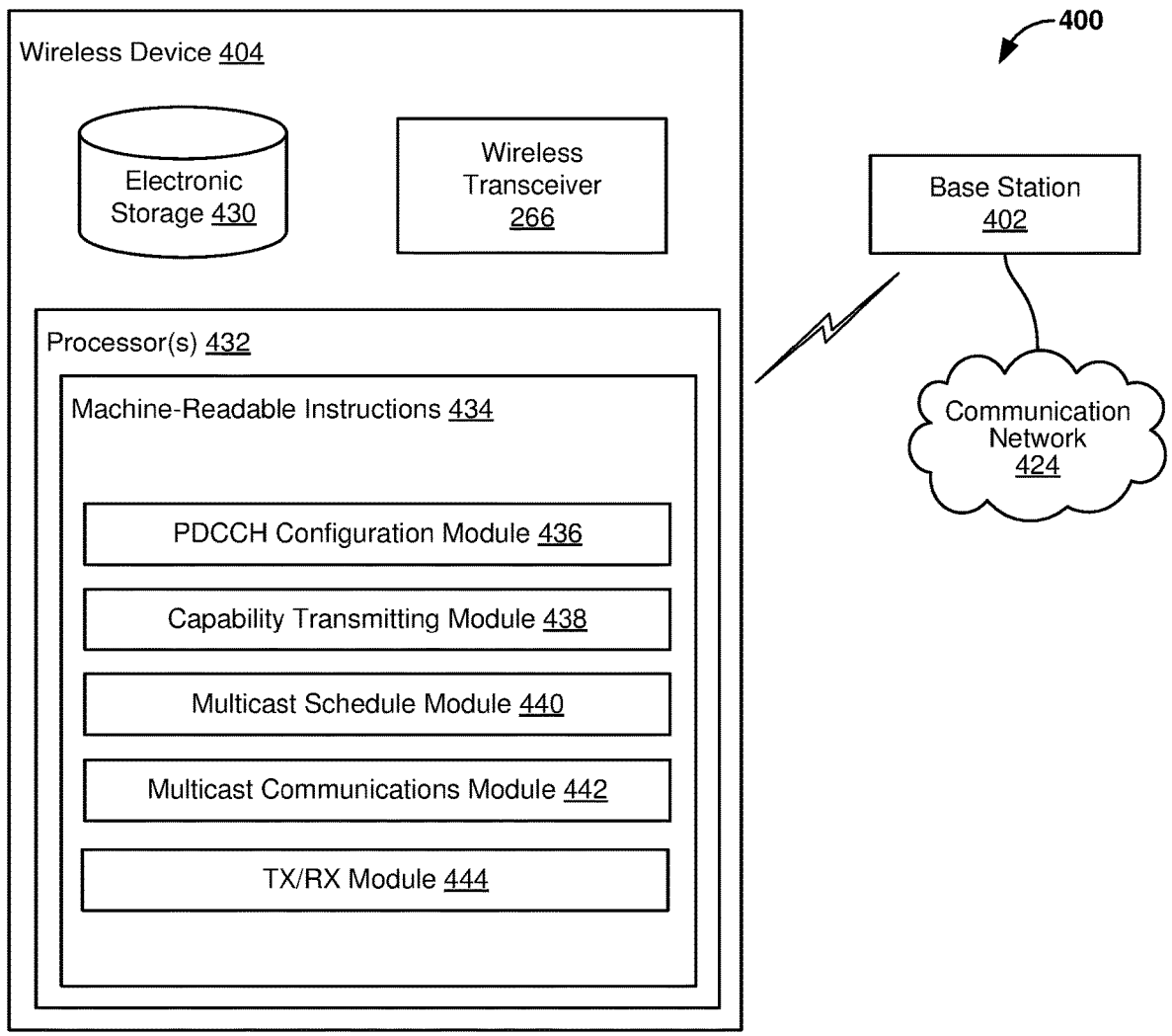
FIG. 4B is a component block diagram illustrating components and processing modules of a wireless device suitable for use with various embodiments.

FIGS. 4A and 4B are component block diagrams illustrating a system 400 configured for enhancing coverage for initial access accordance with various embodiments. With reference to FIGS. 1-4B, system 400 may include a base station 402 and a wireless device 404 (e.g., 110a-110d, 120a-120e, 200, 320, 350). The base station 402 and the wireless device 404 exchange wireless communications in order to establish a wireless communication link 122, 124, 126.

The base station 402 and the wireless device 404 may include one or more processors 428, 432 coupled to electronic storage 426, 430 and a wireless transceiver (e.g., 266). In the base station 402 and the wireless device 404, the wireless transceiver 266 may be configured to receive messages sent in transmissions and pass such message to the processor(s) 428, 432 for processing. Similarly, the processor 428, 432 may be configured to send messages for transmission to the wireless transceiver 266 for transmission.

Referring to the base station 402, the processor(s) 428 may be configured by machine-readable instructions 406. Machine-readable instructions 406 may include one or more instruction modules. The instruction modules may include computer program modules. The instruction modules may include one or more of a PDCCH configuration module 408, a capability determining module 410, a multicast scheduling module 412, a multicast communications module 414, a transmit/receive (TX/RX) module 416, or other instruction modules.

The PDCCH configuration module 408 may be configured to transmitting to a wireless device an indication of whether to monitor a group common physical downlink control channel (GC PDCCH), a wireless device-specific PDCCH, or both the GC PDCCH and the wireless device-specific PDCCH for multicast configuration information.

The capability determining module 410 may be configured to determine a capability of the wireless device to receive multicast scheduling information based on a reply received from the wireless device.

The multicast scheduling module 412 may be configured to determine a schedule for transmitting multicast communications to the wireless device based on a capability reported by the wireless device. In some embodiments, the multicast scheduling module 412 may be configured to transmit to the wireless device an indication of whether multicast communications will be scheduled by the GC PDCCH, the wireless device-specific PDCCH, or both the GC PDCCH and the wireless device-specific PDCCH, based on the determined capability of the wireless device.

The multicast communications module 414 may be configured to transmit to the wireless device the multicast communications according to the multicast configuration information and the schedule.

The transmit/receive (TX/RX) module 416 may be configured to enable communications with the wireless device 402, e.g., via the wireless transceiver 266.

Referring to the wireless device 404, the processor(s) 432 may be configured by machine-readable instructions 434. Machine-readable instructions 406 may include one or more instruction modules. The instruction modules may include computer program modules. The instruction modules may include one or more of a PDCCH configuration module 436, a capability transmitting module 438, a multicast schedule module 440, a multicast communication module 442, a TX/RX module 444, or other instruction modules.

The PDCCH configuration module 436 may be configured to receive from a base station an indication of whether to monitor a GC PDCCH, a wireless device-specific PDCCH, or both the GC PDCCH and the wireless device-specific PDCCH for multicast configuration information.

The capability transmitting module 438 may be configured to transmit to the base station a capability of the wireless device to receive multicast scheduling information.

The multicast schedule module 440 may be configured to receive from the base station an indication of whether multicast communications will be scheduled by the GC PDCCH, the wireless device-specific PDCCH, or both the GC PDCCH and the wireless device-specific PDCCH, based on the capability of the wireless device.

The multicast communication module 442 may be configured to receive from the base station the multicast communications according to the multicast configuration information and the schedule.

The TX/RX module 444 may be configured to enable communications with the base station 402, e.g., via the wireless transceiver 266.

In some embodiments, the base station 402 and the wireless device 404 may be operatively linked via one or more electronic communication links (e.g., wireless communication link 122, 124, 126). It will be appreciated that this is not intended to be limiting, and that the scope of this disclosure includes embodiments in which the base station 402 and the wireless device 404 may be operatively linked via some other communication medium.

The electronic storage 426, 430 may include non-transitory storage media that electronically stores information. The electronic storage media of electronic storage 426, 430 may include one or both of system storage that is provided integrally (i.e., substantially non-removable) with the base station 402 and the wireless device 404 and/or removable storage that is removably connectable to the base station 402 and the wireless device 404 via, for example, a port (e.g., a universal serial bus (USB) port, a firewire port, etc.) or a drive (e.g., a disk drive, etc.). Electronic storage 426, 430 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426, 430 may include one or more virtual storage resources (e.g., cloud storage, a virtual private network, and/or other virtual storage resources). Electronic storage 426, 430 may store software algorithms, information determined by processor(s) 428, 432, information received from the base station 402 and the wireless device 404, or other information that enables the base station 402 and the wireless device 404 to function as described herein.

Processor(s) 428, 432 may be configured to provide information processing capabilities in the base station 402 and the wireless device 404. As such, the processor(s) 428, 432 may include one or more of a digital processor, an analog processor, a digital circuit designed to process information, an analog circuit designed to process information, a state machine, and/or other mechanisms for electronically processing information. Although the processor(s) 428, 432 are illustrated as single entities, this is for illustrative purposes only. In some embodiments, the processor(s) 428, 432 may include a plurality of processing units and/or processor cores. The processing units may be physically located within the same device, or processor(s) 428, 432 may represent processing functionality of a plurality of devices operating in coordination. The processor(s) 428, 432 may be configured to execute modules 408-416 and modules 436-444 and/or other modules by software; hardware; firmware; some combination of software, hardware, and/or firmware; and/or other mechanisms for configuring processing capabilities on processor(s) 428, 432. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 408-416 and modules 436-444 described below is for illustrative purposes, and is not intended to be limiting, as any of modules 408-416 and modules 436-444 may provide more or less functionality than is described. For example, one or more of the modules 408-416 and modules 436-444 may be eliminated, and some or all of its functionality may be provided by other modules 408-416 and modules 436-444. As another example, the processor(s) 428, 432 may be configured to execute one or more additional modules that may perform some or all of the functionality attributed below to one of the modules 408-416 and modules 436-444.

FIG. 5A is a process flow diagram illustrating a method 500a performed by a processor of a base station device for managing control signaling for multicast communications according to various embodiments. With reference to FIGS. 1-5A, the operations of the method 500a may be performed by a processor (such as the processor 210, 212, 214, 216, 218, 252, 260, 428) of a base station device (such as the base station 110a-110d, 200, 350, 402).

In block 502, the processor may transmit to a wireless device an indication of whether to monitor a group common physical downlink control channel (GC PDCCH), a wireless device-specific PDCCH, or both the GC PDCCH and the wireless device-specific PDCCH for multicast configuration information. In some embodiments, the processor may transmit a Control Resource Set (CORESET) configuration indicating whether to enable monitoring (e.g., by the wireless device) of the GC PDCCH, the wireless device-specific PDCCH, or both the GC PDCCH and the wireless device-specific PDCCH. In some embodiments, the processor may transmit the CORESET configuration by Radio Resource Control (RRC) signaling, by a DCI format, by a MAC-CE, or by another signal or message. In some embodiments, the base station may configure whether to enable (or disable) a wireless device-specific PDCCH and/or a GC PDCCH for multicast services via a DCI format or a MAC-CE even if both the wireless device-specific PDCCH and the GC PDCCH are enabled by RRC signaling.

In some embodiments, the processor may transmit a Search Space (SS) configuration indicating whether to enable monitoring (e.g., by the wireless device) of the GC PDCCH, the wireless device-specific PDCCH, or both the GC PDCCH and the wireless device-specific PDCCH. In some embodiments, the processor may transmit a Common SS configuration (CS S) indicating whether to enable monitoring of the GC PDCCH, the wireless device-specific PDCCH, or both the GC PDCCH and the wireless device-specific PDCCH. In some embodiments, the processor may transmit a UE-specific SS (USS) configuration indicating whether to enable monitoring of the GC PDCCH, the wireless device-specific PDCCH, or both the GC PDCCH and the wireless device-specific PDCCH. In some embodiments, the processor may transmit a Downlink Control Information (DCI) format indicating whether to enable a Radio Network Temporary Identifier (RNTI) associated with the GC PDCCH, an RNTI associated with the wireless device-specific PDCCH, or both the RNTI associated with the GC PDCCH and the RNTI associated with the wireless device-specific PDCCH. In some embodiments, the processor may transmit a Channel Quality Indicator (CQI threshold or a Signal-Plus-Interference-to-Noise Ratio (SINR) threshold indicating whether to enable the RNTI(s) associated with the GC PDCCH and/or the RNTI(s) associated with the wireless device-specific PDCCH. The wireless device may use the CQI threshold and/or the SINR threshold to determine whether to monitor the GC PDCCH or the wireless device-specific PDCCH, as further described below. Means for performing functions of the operations in block 502 may include the processor (e.g., 210, 212, 214, 216, 218, 252, 260, 428) and the wireless transceiver (e.g., 266).

In block 504, the processor may determine a schedule for transmitting multicast communications to the wireless device based on a capability reported by the wireless device. Means for performing functions of the operations in block 504 may include the processor (e.g., 210, 212, 214, 216, 218, 252, 260, 428).

In block 506, the processor may transmit to the wireless device an indication of whether a transport block for GC multicast communications including services for multicast communications-will be scheduled by the GC PDCCH, the wireless device-specific PDCCH, or both the GC PDCCH and the wireless device-specific PDCCH. Means for performing functions of the operations in block 506 may include the processor (e.g., 210, 212, 214, 216, 218, 252, 260, 428) and the wireless transceiver (e.g., 266).

In block 508, the processor may transmit to the wireless device the multicast communications according to the multicast configuration information and the schedule. Means for performing functions of the operations in block 506 may include the processor (e.g., 210, 212, 214, 216, 218, 252, 260, 428) and the wireless transceiver (e.g., 266).

FIGS. 5B-5F illustrates operations 500b-500f that may be performed as part of the method 500a for managing control signaling for multicast communications according to various embodiments. With reference to FIGS. 1-5F, the operations 500b-500f may be performed by a processor (such as the processor 210, 212, 214, 216, 218, 252, 260, 428) of a base station device (such as the base station 110a-110d, 200, 350, 402).

Figure 5B:
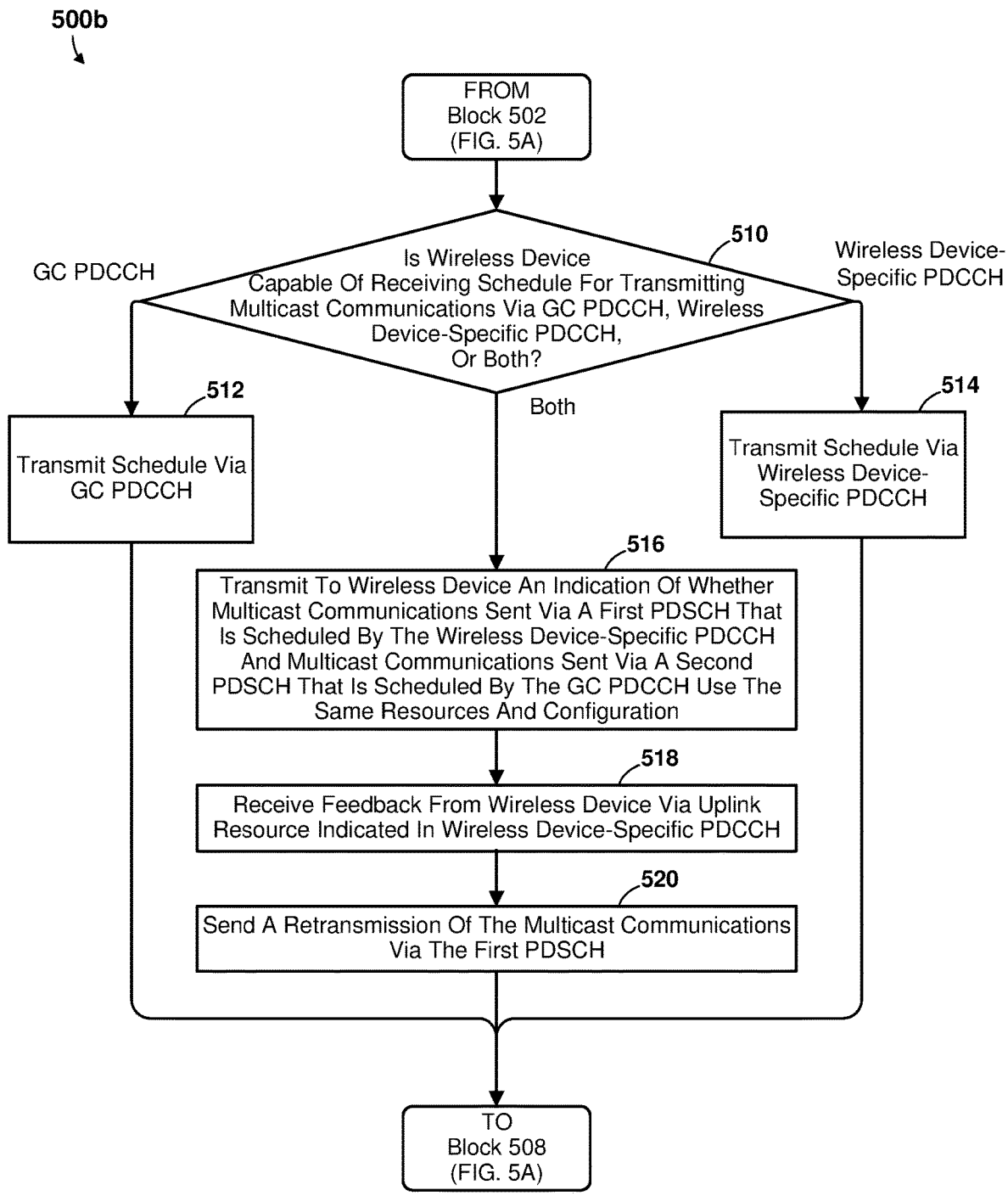
FIGS. 5B-5F illustrate operations that may be performed as part of the method for managing control signaling for multicast communications according to various embodiments.

Referring to FIG. 5B, in operations 500b following the performance of the operations of block 502 (FIG. 5A), the processor may determine whether the wireless device is capable of receiving the schedule for transmitting multicast communications to the wireless device via the GC PDCCH, the wireless device-specific PDCCH, or both the GC PDCCH and the wireless device-specific PDCCH in determination block 510. In some embodiments, the processor may determine based on the capability reported by the wireless device whether the wireless device is capable of receiving multicast communications via the GC PDCCH or the wireless device-specific PDCCH in a same slot or overlapping in time. Means for performing functions of the operations in block 510 may include the processor (e.g., 210, 212, 214, 216, 218, 252, 260, 428).

In response to determining that the wireless device is capable of receiving the schedule via the GC PDCCH (i.e., determination block 510="GC PDCCH"), the processor may transmit the schedule via the GC PDCCH in block 512. Means for performing functions of the operations in block 512 may include the processor (e.g., 210, 212, 214, 216, 218, 252, 260, 428) and the wireless transceiver (e.g., 266).

In response to determining that the wireless device is capable of receiving the schedule via the wireless device-specific PDCCH (i.e., determination block 510="wireless device-specific PDCCH"), the processor may transmit the schedule via the wireless device-specific PDCCH in block 514. In some embodiments, the wireless device-specific PDCCH may include an indication in a DCI (e.g., a flag) to differentiate unicast data and multicast data. Means for performing functions of the operations in block 514 may include the processor (e.g., 210, 212, 214, 216, 218, 252, 260, 428) and the wireless transceiver (e.g., 266).

In response to determining that the wireless device is capable of receiving the schedule via both the GC PDCCH and the wireless device-specific PDCCH (i.e., determination block 510="Both"), the processor may transmit to the wireless device an indication of whether multicast communications sent via a first physical downlink shared channel (PDSCH) that is scheduled by the wireless device-specific PDCCH and multicast communications sent via a second PDSCH that is scheduled by the GC PDCCH use the same resources and configuration in block 516. In some embodiments, the processor may provide an indication to the wireless device that the GC PDCCH and the wireless device-specific PDCCH will not be transmitted in the same slot. In some embodiments, the processor may provide an indication to the wireless device that PDSCHs scheduled by the GC PDCCH and by the wireless device-specific PDCCH will not overlap in the time domain. In various embodiments, the processor may provide one or more such indications to the wireless device based on the capability or capabilities of the wireless device. In some embodiments, the processor may transmit to the wireless device a wireless device-specific PDCCH including a field to indicate whether the wireless device-specific PDCCH is associated with the GC PDCCH for multicast transmission. In some embodiments, the processor may transmit to the wireless device an indication that the wireless device-specific PDCCH includes a same Hybrid Automatic Retransmission Request (HARQ) process ID and a same New Data Indicator (NDI) as an associated GC PDCCH for multicast transmission. Means for performing functions of the operations in block 516 may include the processor (e.g., 210, 212, 214, 216, 218, 252, 260, 428) and the wireless transceiver (e.g., 266).

In some embodiments, in the case that the wireless device is capable of receiving multicast scheduling information via both the GC PDCCH and the wireless device-specific PDCCH, the base station may schedule a PDSCH, such as based on a Group-RNTI (G-RNTI) by a wireless-device specific PDCCH. In some embodiments, the PDSCH scheduled by the wireless-device specific PDCCH may be same as that of the GC PDCCH. This may indicate to the wireless device that the PDSCH uses, for example, the same resource allocation, modulation and coding scheme, and other similar characteristics. In some embodiments, the wireless device may use a physical uplink control channel (PUCCH) and/or transmit power control (TPC) indicated by the wireless device-specific PDCCH, which may override the PUCCH and/or TPC indicated by a group PUCCH and/or group TPC, if they are different.

In some embodiments, the PDSCH (e.g., based on a G-RNTI or C-RNTI)) scheduled by the wireless-device specific PDCCH may be different from that of the GC PDCCH, but may be associated with the same transport block (TB). This may indicate to the wireless device that the PDSCH uses different resource allocation, redundancy version (RV). The wireless device may also be configured to associate a wireless device-specific PDCCH indicated by a Hybrid Automatic Retransmission Request (HARQ) process ID with the group PDCCH. In such embodiments, the wireless device may combine a PDSCH scheduled by the GC PDCCH and a PDSCH scheduled by the wireless device-specific PDCCH.

In block 518, the processor (i.e., the base station) may receive feedback from the wireless device via an uplink resource indicated in the wireless device-specific PDCCH. For example, the base station may receive from the wireless device Hybrid Automatic Retransmission Request (HARQ) acknowledgements or feedback (e.g., a HARQ ACK). Means for performing functions of the operations in block 518 may include the processor (e.g., 210, 212, 214, 216, 218, 252, 260, 428) and the wireless transceiver (e.g., 266).

In block 520, the processor may send a retransmission of the multicast communications via the first PDSCH. In some embodiments, the processor may send the retransmission of the multicast communications based on or in response to the HARQ feedback. In some embodiments, the processor may send the retransmission via a wireless device-specific downlink channel (e.g., the first PDSCH may be a wireless device-specific PDSCH). Means for performing functions of the operations in block 520 may include the processor (e.g., 210, 212, 214, 216, 218, 252, 260, 428) and the wireless transceiver (e.g., 266).

Following the operations of block 512, 514, or 520, the processor may perform the operations of block 508 (FIG. 5A) as described.

Figure 5C:
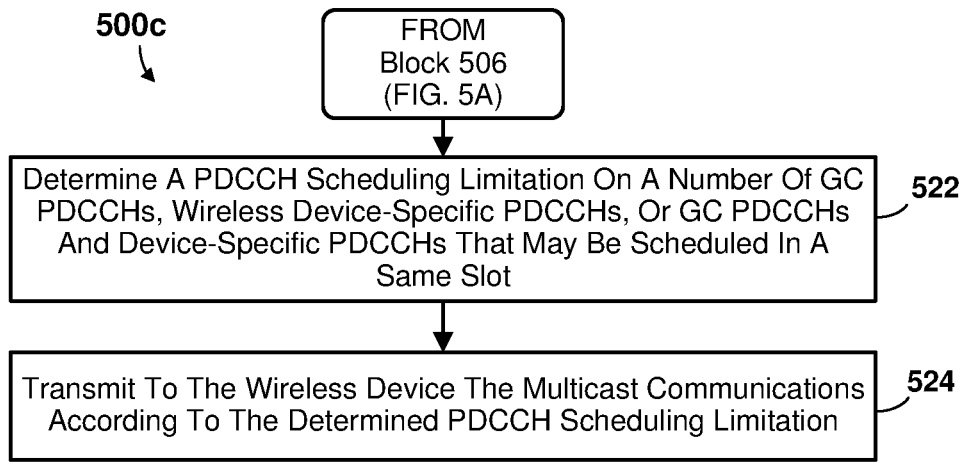

Referring to FIG. 5C, in operations 500c following the performance of the operations of block 506 (FIG. 5A), the processor may determine a PDCCH scheduling limitation on a number of GC PDCCHs, wireless device-specific PDCCHs, or GC PDCCHs and device-specific PDCCHs that may be scheduled in a same slot in block 522. Means for performing functions of the operations in block 522 may include the processor (e.g., 210, 212, 214, 216, 218, 252, 260, 428).

In block 524, the processor may transmit to the wireless device the multicast communications according to the determined PDCCH scheduling limitation. Means for performing functions of the operations in block 522 may include the processor (e.g., 210, 212, 214, 216, 218, 252, 260, 428) and the wireless transceiver (e.g., 266).

Figure 5D:
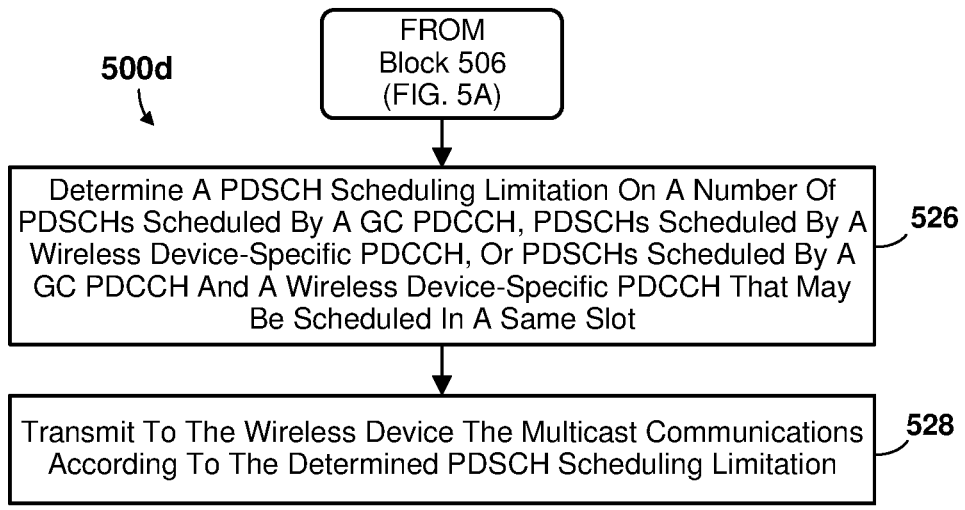

Referring to FIG. 5D, in operations 500d following the performance of the operations of block 506 (FIG. 5A), the processor may determine a PDSCH scheduling limitation on a number of PDSCHs scheduled by a GC PDCCH, PDSCHs scheduled by a wireless device-specific PDCCH, or PDSCHs scheduled by a GC PDCCH and a wireless device-specific PDCCH that may be scheduled in a same slot in block 526. Means for performing functions of the operations in block 526 may include the processor (e.g., 210, 212, 214, 216, 218, 252, 260, 428).

In block 528, transmit to the wireless device the multicast communications according to the determined PDSCH scheduling limitation. Means for performing functions of the operations in block 528 may include the processor (e.g., 210, 212, 214, 216, 218, 252, 260, 428) and the wireless transceiver (e.g., 266).

Figure 5E:
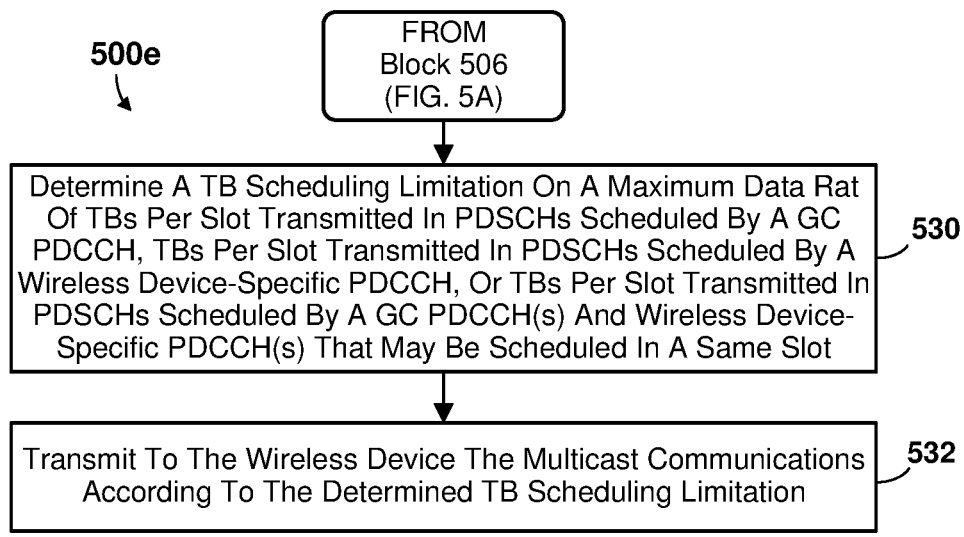

Referring to FIG. 5E, in operations 500e following the performance of the operations of block 506 (FIG. 5A), the processor may determine a TB scheduling limitation on a maximum data rate of TBs per slot transmitted in PDSCHs scheduled by a GC PDCCH, TBs per slot transmitted in PDSCHs scheduled by a wireless device-specific PDCCH, or TBs per slot transmitted in PDSCHs scheduled by a GC PDCCH(s) and wireless device-specific PDCCH(s) that may be scheduled in a same slot in block 530. Means for performing functions of the operations in block 530 may include the processor (e.g., 210, 212, 214, 216, 218, 252, 260, 428).

In block 532, the processor may transmit to the wireless device the multicast communications according to the determined TB scheduling limitation. Means for performing functions of the operations in block 532 may include the processor (e.g., 210, 212, 214, 216, 218, 252, 260, 428) and the wireless transceiver (e.g., 266).

Figure 5F:
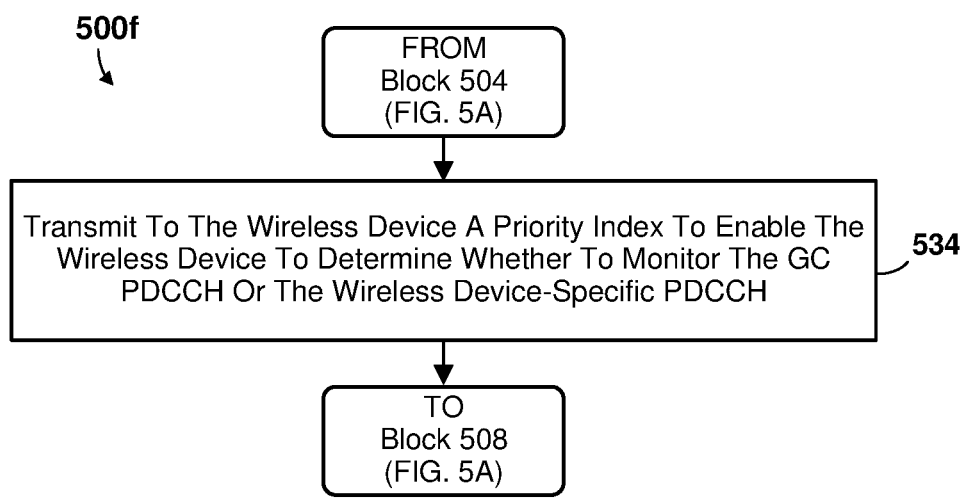

Referring to FIG. 5F, in operations 500f following the performance of the operations of block 504 (FIG. 5A), the processor may transmit to the wireless device a priority index to enable the wireless device to determine whether to monitor the GC PDCCH or the wireless device-specific PDCCH in block 534. In some embodiments, the base station may indicate the priority index by RRC signaling or DCI to the wireless device. In some embodiments, based on the priority index, the wireless device may monitor a GC PDCCH or device-specific PDCCH associated with a high priority (e.g., a priority index of 1). In some embodiments, based on the priority index, the wireless device may not monitor a GC PDCCH or device-specific PDCCH associated with a low priority (e.g., priority index of 0). In some embodiments, the base station may configure the priority index by RRC signaling or DCI differently per RNTI associated with the GC-PDCCH. In some embodiments, the base station may configure the priority index based on a CORE-SET ID.

The processor may then perform the operations of block 508 (FIG. 5A) as described.

Figure 6A:
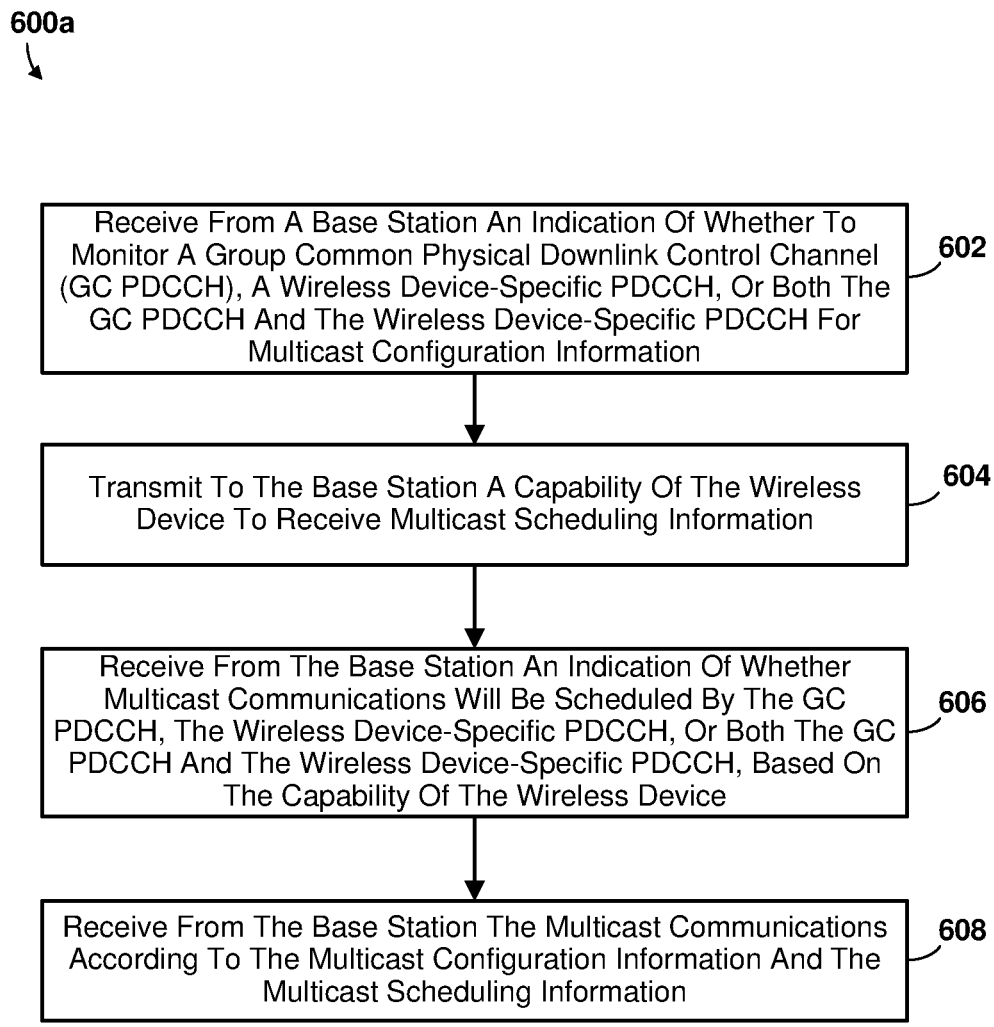
FIG. 6A is a process flow diagram illustrating a method performed by a processor of a wireless device for managing control signaling for multicast communications according to various embodiments.

FIG. 6A is a process flow diagram illustrating a method 600a performed by a processor of a wireless device for managing control signaling for multicast communications according to various embodiments. With reference to FIGS. 1-6A, the operations of the method 600a may be performed by a processor (such as the processor 210, 212, 214, 216, 218, 252, 260, 432) of a base station device (such as the wireless device 120a-120f, 200, 320, 404).

In block 602, the processor (i.e., the wireless device) wireless device may receive from a base station an indication of whether to monitor a group common physical downlink control channel (GC PDCCH), a wireless device-specific PDCCH for multicast configuration information, or both the GC PDCCH and the wireless device-specific PDCCH for multicast configuration information. In some embodiments, the processor may receive a Control Resource Set (CORESET) configuration indicating whether to enable monitor the GC PDCCH, the wireless device-specific PDCCH, or both the GC PDCCH and the wireless device-specific PDCCH.

In some embodiments, the processor may receive a Synchronization Signal (SS) configuration indicating whether to enable monitoring of the GC PDCCH, the wireless device-specific PDCCH, or both the GC PDCCH and the wireless device-specific PDCCH. In some embodiments, the processor may receive from the base station a common SS configuration indicating whether to enable monitoring of the GC PDCCH, the wireless device-specific PDCCH, or both the GC PDCCH and the wireless device-specific PDCCH. In some embodiments, the processor may receive from the base station a wireless device-specific SS configuration indicating whether to enable monitoring of the GC PDCCH, the wireless device-specific PDCCH, or both the GC PDCCH and the wireless device-specific PDCCH.

In some embodiments, the processor may receive a Downlink Control Information (DCI) format indicating whether to enable a Radio Network Temporary Identifier (RNTI) associated with the GC PDCCH, an RNTI associated with the wireless device-specific PDCCH, or both the RNTI associated with the GC PDCCH and the RNTI associated with the wireless device-specific PDCCH. In some embodiments, the processor may receive a priority index from the base station, and may use the priority index and a priority associated with the GC PDCCH or the wireless device-specific PDCCH to determine whether to monitor the GC PDCCH or the wireless device-specific PDCCH. In some embodiments, the processor may receive from the base station a wireless device-specific PDCCH including a field indicating whether the wireless device-specific PDCCH is associated with the GC PDCCH for multicast transmission. In some embodiments, the processor may receive from the base station an indication that the wireless device-specific PDCCH includes a same Hybrid Automatic Retransmission Request (HARQ) process ID and a same New Data Indicator (NDI) as an associated GC PDCCH for multicast transmission.

Means for performing functions of the operations in block 602 may include the processor (e.g., 210, 212, 214, 216, 218, 252, 260, 432) and the wireless transceiver (e.g., 266).

In block 604, the processor may transmit to the base station a capability of the wireless device to receive multicast scheduling information. In some embodiments, the capability of the wireless device may include a capability of the wireless device to receive a schedule of the multicast communications via the GC PDCCH, the wireless device-specific PDCCH, or both the GC PDCCH and the wireless device-specific PDCCH. Means for performing functions of the operations in block 604 may include the processor (e.g., 210, 212, 214, 216, 218, 252, 260, 432) and the wireless transceiver (e.g., 266).

In block 606, the processor may receive from the base station an indication of whether multicast communications will be scheduled by the GC PDCCH, the wireless device-specific PDCCH, or both the GC PDCCH and the wireless device-specific PDCCH, based on the capability of the wireless device. Means for performing functions of the operations in block 606 may include the processor (e.g., 210, 212, 214, 216, 218, 252, 260, 432) and the wireless transceiver (e.g., 266).

In block 608, the processor may receive from the base station the multicast communications according to the multicast configuration information and the multicast scheduling information. Means for performing functions of the operations in block 608 may include the processor (e.g., 210, 212, 214, 216, 218, 252, 260, 432) and the wireless transceiver (e.g., 266).

FIGS. 6B-6F illustrates operations 600b-600f that may be performed by a processor of wireless device as part of the method 600a for managing control signaling for multicast communications according to various embodiments. With reference to FIGS. 1-6F, the operations 600b-600f may be performed by a processor (such as the processor 210, 212, 214, 216, 218, 252, 260, 432) of a wireless device (such as the wireless device 120a-120f, 200, 320, 404).

Figure 6B:
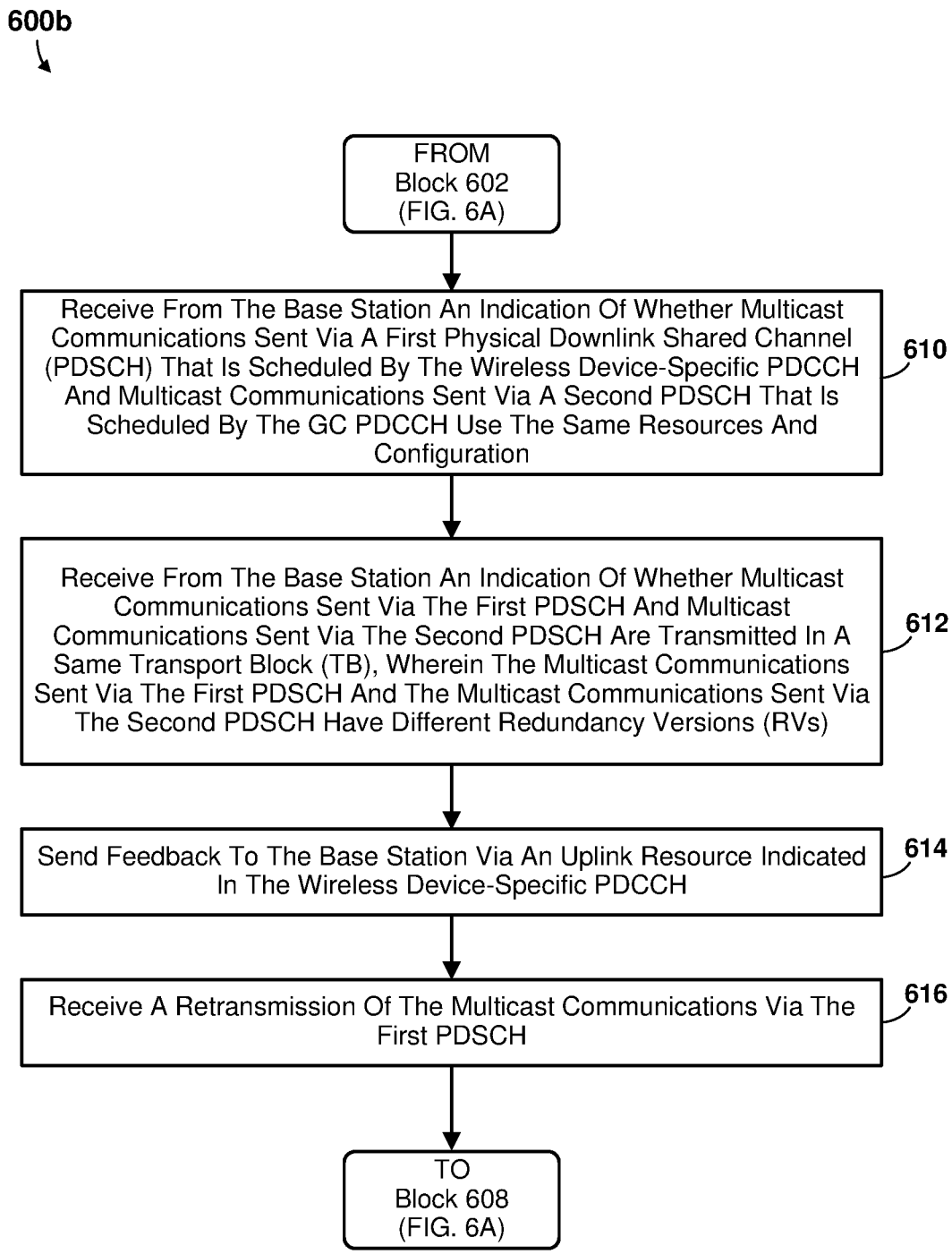
FIGS. 6B-6F illustrate operations that may be performed by a processor of wireless device as part of the method for managing control signaling for multicast communications according to various embodiments.

Referring to FIG. 6B, in operations 600b following the performance of the operations of block 602 (FIG. 6A) of the method 600a, the processor may receive from the base station an indication of whether multicast communications sent via a first physical downlink shared channel (PDSCH) that is scheduled by the wireless device-specific PDCCH and multicast communications sent via a second PDSCH that is scheduled by the GC PDCCH use the same resources and configuration in block 610. Means for performing functions of the operations in block 610 may include the processor (e.g., 210, 212, 214, 216, 218, 252, 260, 432) and the wireless transceiver (e.g., 266).

In block 612, the processor may receive from the base station an indication of whether multicast communications sent via the first PDSCH and multicast communications sent via the second PDSCH are transmitted in a same transport block (TB), wherein the multicast communications sent via the first PDSCH and the multicast communications sent via the second PDSCH have different redundancy versions (RVs). Means for performing functions of the operations in block 612 may include the processor (e.g., 210, 212, 214, 216, 218, 252, 260, 432) and the wireless transceiver (e.g., 266).

In block 614, the processor may send feedback to the base station via an uplink resource indicated in the wireless device-specific PDCCH. Means for performing functions of the operations in block 614 may include the processor (e.g., 210, 212, 214, 216, 218, 252, 260, 432) and the wireless transceiver (e.g., 266).

In block 616, the processor may receive a retransmission of the multicast communications via the first PDSCH. In some embodiments, the wireless device may receive from the base station an indication that the retransmission will be sent via the same transport block (TB) but having different redundancy version (RV), to enable the wireless device to identify the retransmitted multicast communications. In some embodiments, the wireless device may determine an association between multicast communications and retransmitted multicast communications based on a HARQ process ID (which the base station may indicate in a PDCCH message). In some embodiments, if the first PDSCH and the second PDSCH carry the same TB associated with a configured HARQ process ID pair, the wireless device may combine the multicast communications received via the first PDSCH and the second PDSCH. In some embodiments, the wireless device may send the HARQ-ACK feedback using the uplink resource configuration indicated in the wireless device-specific PDCCH, or GC PDCCH, or the latest PDCCH received by the wireless device. Means for performing functions of the operations in block 616 may include the processor (e.g., 210, 212, 214, 216, 218, 252, 260, 432) and the wireless transceiver (e.g., 266).

The processor may then perform the operations of block 608 (FIG. 6A).

Figure 6C:
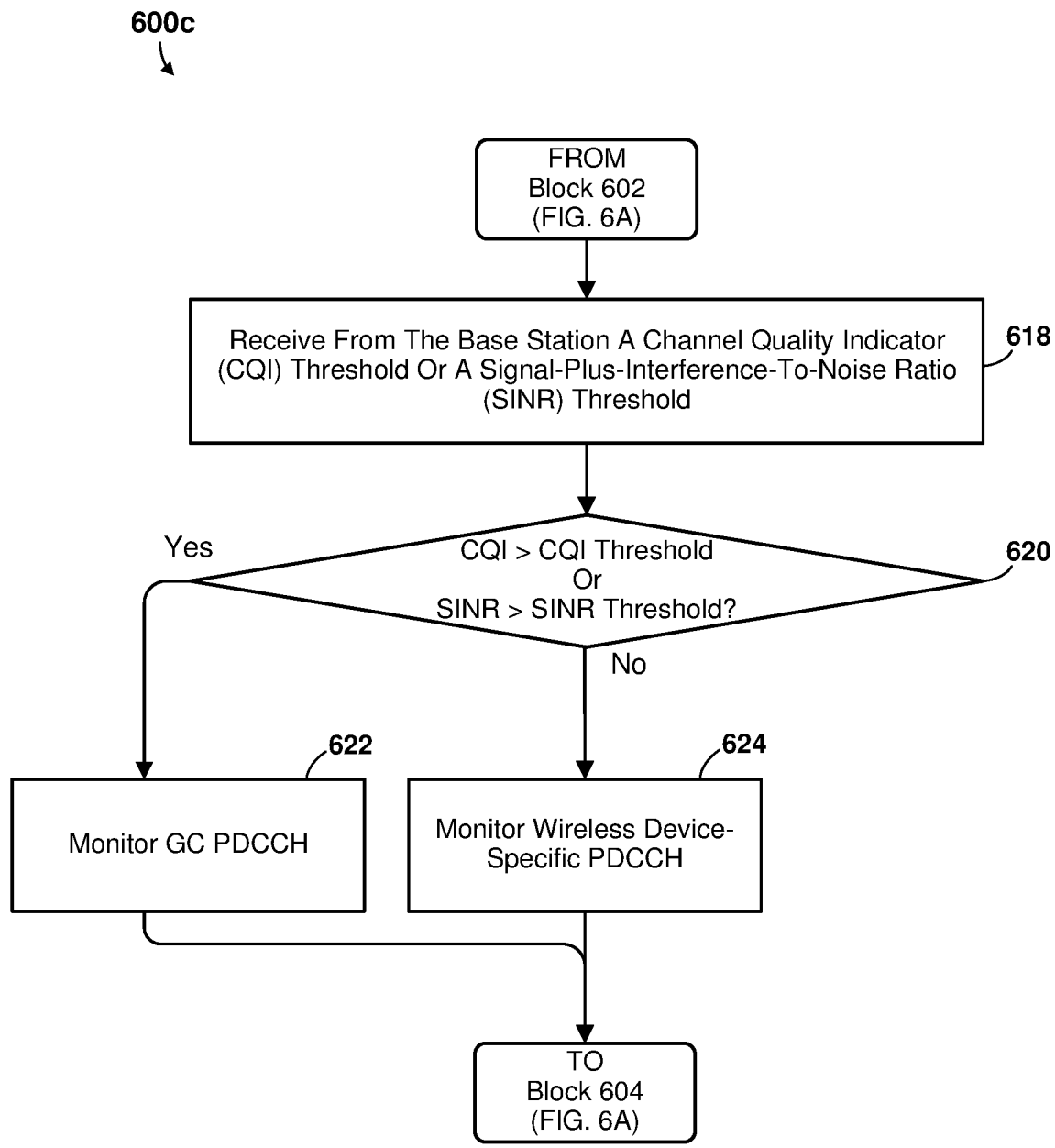

Referring to FIG. 6C, in operations 600c following the performance of the operations of block 602 (FIG. 6A), the processor may receive from the base station a Channel Quality Indicator (CQI) threshold or a Signal-Plus-Interference-to-Noise Ratio (SINR) threshold in block 618. Means for performing functions of the operations in block 618 may include the processor (e.g., 210, 212, 214, 216, 218, 252, 260, 432) and the wireless transceiver (e.g., 266).

In determination block 620, the processor may determine whether a CQI of a signal from the base station exceeds the CQI threshold or a SINR of a signal from the base station exceeds the SINR threshold. Means for performing functions of the operations in determination block 620 may include the processor (e.g., 210, 212, 214, 216, 218, 252, 260, 432).

In response to determining that the CQI of the signal from the base station exceeds the CQI threshold or the SINR of the signal from the base station exceeds the SINR threshold (i.e., determination block 620="Yes"), the processor may monitor the GC PDCCH in block 622. In some embodiments, monitoring the GC PDCCH includes enabling an RNTI associated with the GC PDCCH. Means for performing functions of the operations in block 622 may include the processor (e.g., 210, 212, 214, 216, 218, 252, 260, 432) and the wireless transceiver (e.g., 266).

In response to determining that the CQI of the signal from the base station does not exceed the CQI threshold or the SINR of the signal from the base station does not exceed the SINR threshold (i.e., determination block 620="No"), the processor may monitor the wireless device-specific PDCCH in block 624. In some embodiments, monitoring the wireless device-specific PDCCH includes enabling an RNTI associated with the wireless device-specific PDCCH. Means for performing functions of the operations in block 624 may include the processor (e.g., 210, 212, 214, 216, 218, 252, 260, 432) and the wireless transceiver (e.g., 266).

Following the operations of block 622 or block 624, the processor may proceed to perform the operations of block 604 (FIG. 6A).

Figure 6D:
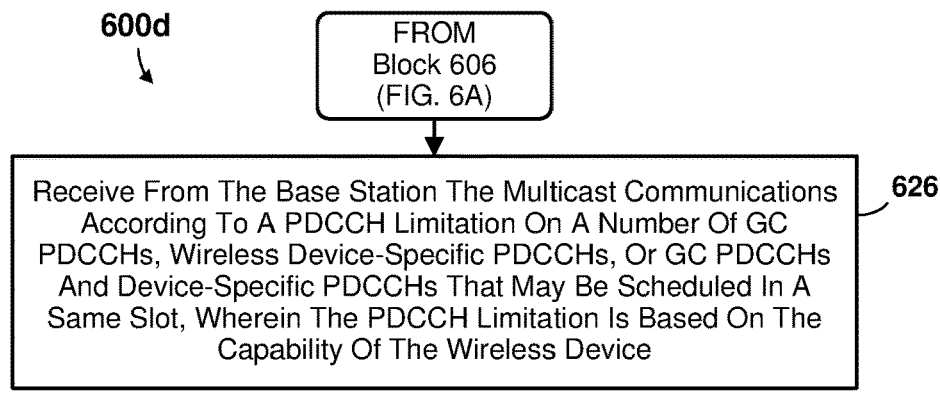

Referring to FIG. 6D, in operations 600d following the performance of the operations of block 606 (FIG. 6A), in some embodiments, the processor may receive from the base station the multicast communications according to a PDCCH limitation on a number of GC PDCCHs, wireless device-specific PDCCHs, or GC PDCCHs and device-specific PDCCHs that may be scheduled in a same slot, wherein the PDCCH limitation is based on the capability of the wireless device in block 626. Means for performing functions of the operations in block 626 may include the processor (e.g., 210, 212, 214, 216, 218, 252, 260, 432) and the wireless transceiver (e.g., 266).

Figure 6E:
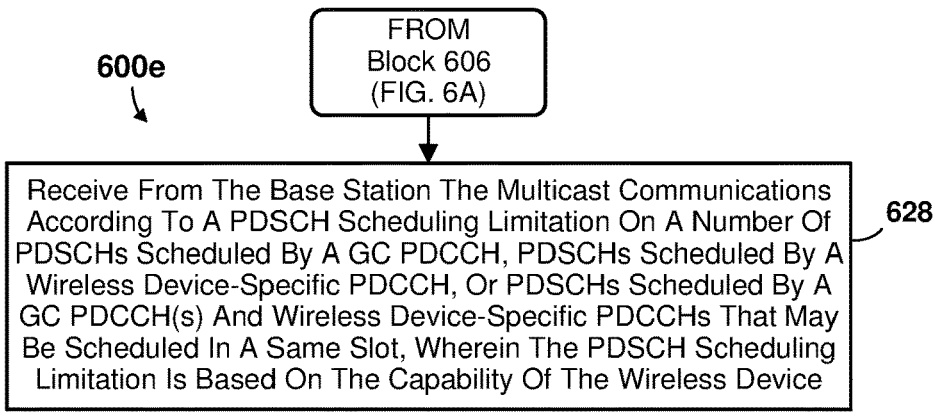

Referring to FIG. 6E, in operations 600e following the performance of the operations of block 606 (FIG. 6A), in some embodiments, the processor may receive from the base station the multicast communications according to a PDSCH scheduling limitation on a number of PDSCHs scheduled by a GC PDCCH, PDSCHs scheduled by a wireless device-specific PDCCH, or PDSCHs scheduled by a GC PDCCH(s) and wireless device-specific PDCCHs that may be scheduled in a same slot, wherein the PDSCH scheduling limitation is based on the capability of the wireless device in block 628. Means for performing functions of the operations in block 628 may include the processor (e.g., 210, 212, 214, 216, 218, 252, 260, 432) and the wireless transceiver (e.g., 266).

Figure 6F:
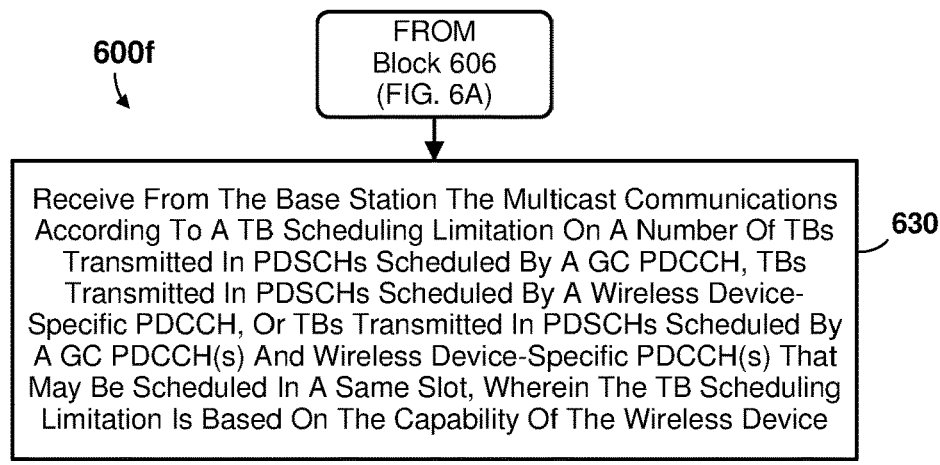

Referring to FIG. 6F, in operations 600f following the performance of the operations of block 606 (FIG. 6A), in some embodiments, the processor may receive from the base station the multicast communications according to a TB scheduling limitation on a number of TBs transmitted in PDSCHs scheduled by a GC PDCCH, TBs transmitted in PDSCHs scheduled by a wireless device-specific PDCCH, or TBs transmitted in PDSCHs scheduled by a GC PDCCH(s) and wireless device-specific PDCCH(s) that may be scheduled in a same slot, wherein the TB scheduling limitation is based on the capability of the wireless device in block 630. Means for performing functions of the operations in block 630 may include the processor (e.g., 210, 212, 214, 216, 218, 252, 260, 432) and the wireless transceiver (e.g., 266).

Figure 7:
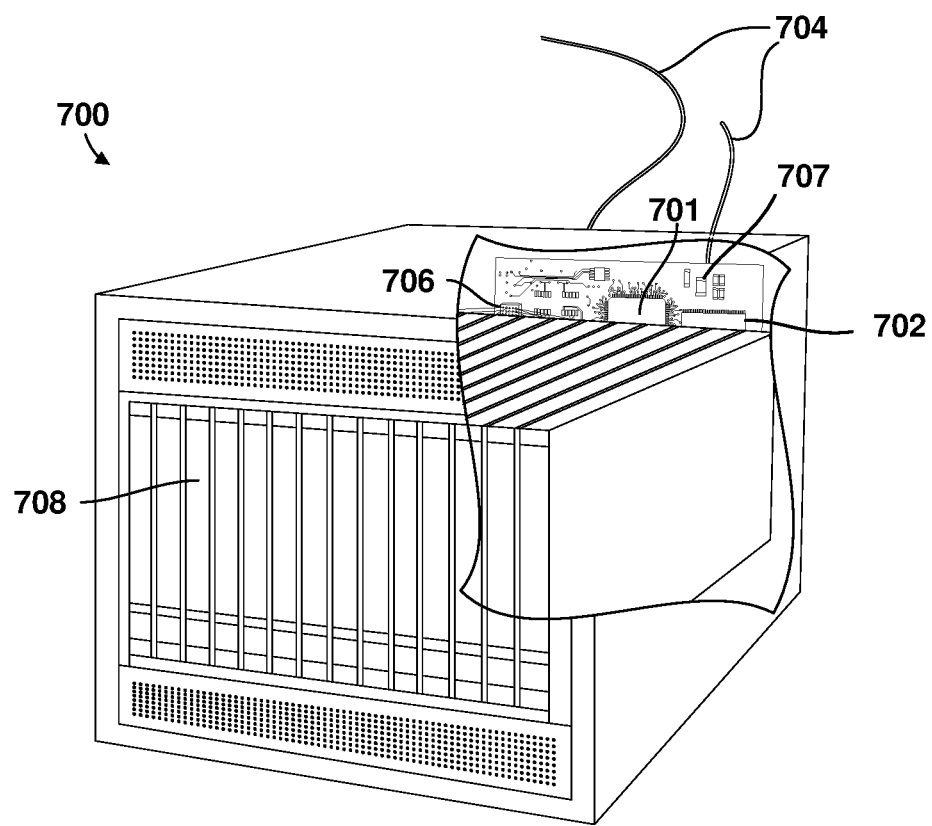
FIG. 7 is a component block diagram of a base station computing device suitable for use with various embodiments.

FIG. 7 is a component block diagram of a base station computing device suitable for use with various embodiments. Such base station computing devices (e.g., base station 110a-110d, 350, 402) may include at least the components illustrated in FIG. 7. With reference to FIGS. 1-7, the base station computing device 700 may typically include a processor 701 coupled to volatile memory 702 and a large capacity nonvolatile memory, such as a disk drive 708. The base station computing device 700 also may include a peripheral memory access device 706 such as a floppy disc drive, compact disc (CD) or digital video disc (DVD) drive coupled to the processor 701. The base station computing device 700 also may include network access ports 704 (or interfaces) coupled to the processor 701 for establishing data connections with a network, such as the Internet or a local area network coupled to other system computers and servers. The base station computing device 700 may include one or more antennas 707 for sending and receiving electromagnetic radiation that may be connected to a wireless communication link. The base station computing device 700 may include additional access ports, such as USB, Firewire, Thunderbolt, and the like for coupling to peripherals, external memory, or other devices.

Figure 8:
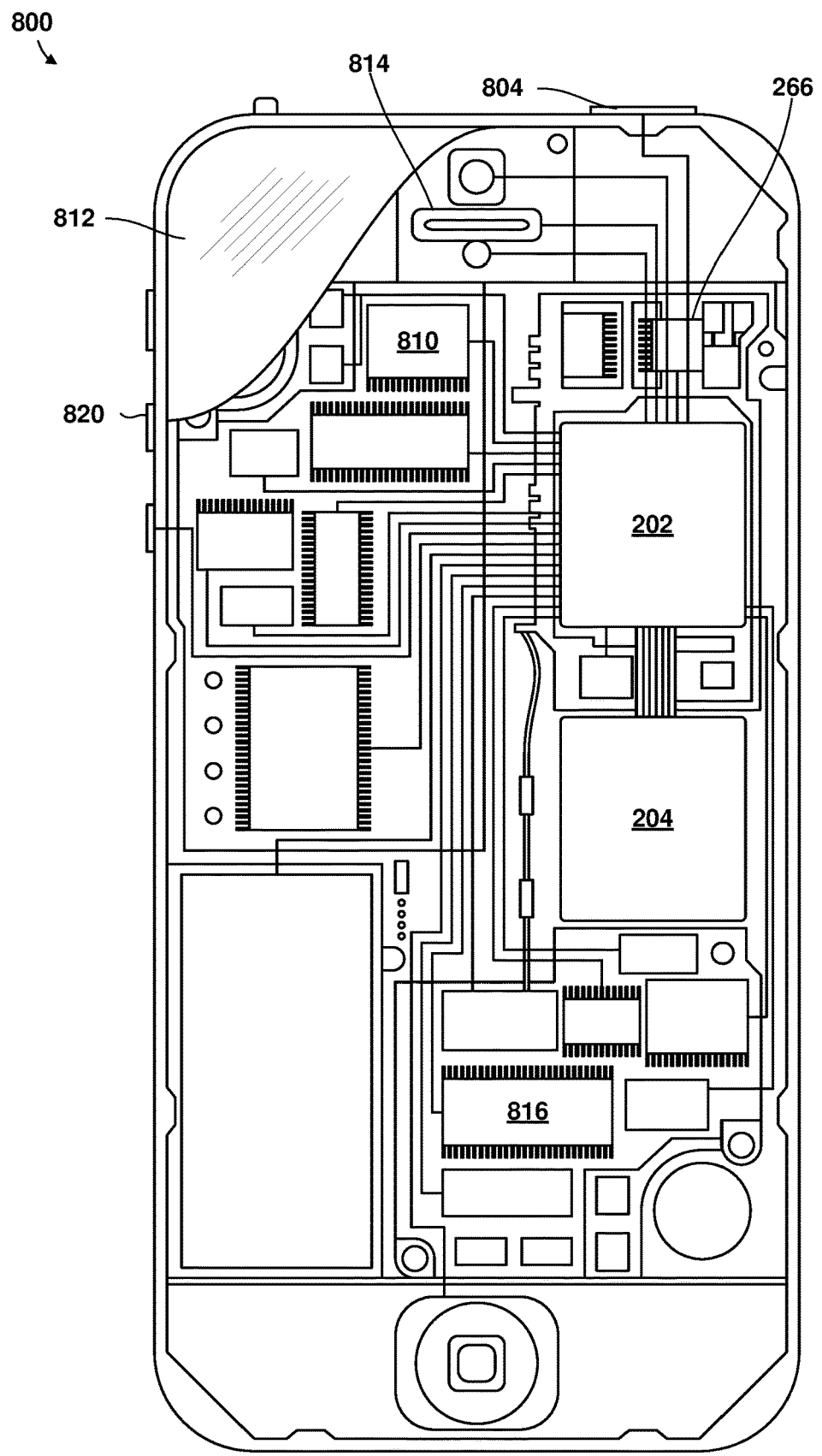
FIG. 8 is a component block diagram of a wireless device suitable for use with various embodiments.

FIG. 8 is a component block diagram of a wireless device 800 suitable for use with various embodiments. With reference to FIGS. 1-8, various embodiments may be implemented on a variety of wireless devices 800 (for example, the wireless device 120a-120e, 200, 320, 404), an example of which is illustrated in FIG. 8 in the form of a smartphone. The wireless device 800 may include a first SOC 202 (for example, a SOC-CPU) coupled to a second SOC 204 (for example, a 5G capable SOC). The first and second SOCs 202, 204 may be coupled to internal memory 816, a display 812, and to a speaker 814. Additionally, the wireless device 800 may include an antenna 804 for sending and receiving electromagnetic radiation that may be connected to a wireless transceiver 266 coupled to one or more processors in the first and/or second SOCs 202, 204. Wireless device 800 may include menu selection buttons or rocker switches 820 for receiving user inputs.

The wireless device 800 wireless device 800 may include a sound encoding/decoding (CODEC) circuit 810, which digitizes sound received from a microphone into data packets suitable for wireless transmission and decodes received sound data packets to generate analog signals that are provided to the speaker to generate sound. One or more of the processors in the first and second SOCs 202, 204, wireless transceiver 266 and CODEC 810 may include a digital signal processor (DSP) circuit (not shown separately).

The processors of the base station computing device 700 and the wireless device 800 may be any programmable microprocessor, microcomputer or multiple processor chip or chips that can be configured by software instructions (applications) to perform a variety of functions, including the functions of some implementations described below. In some wireless devices, multiple processors may be provided, such as one processor within an SOC 204 dedicated to wireless communication functions and one processor within an SOC 202 dedicated to running other applications. Software applications may be stored in the memory 702, 816 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods and operations 500a-500e and 600a-600f may be substituted for or combined with one or more operations of the methods and operations 500a-500e and 600a-600f.

Implementation examples are described in the following paragraphs. While some of the following implementation examples are described in terms of example methods, further example implementations may include: the example methods discussed in the following paragraphs implemented by a base station including a processor configured with processor-executable instructions to perform operations of the methods of the following implementation examples; the example methods discussed in the following paragraphs implemented by a base station including means for performing functions of the methods of the following implementation examples; and the example methods discussed in the following paragraphs may be implemented as a non-transitory processor-readable storage medium having stored thereon processor-executable instructions configured to cause a processor of a base station to perform the operations of the methods of the following implementation examples.

Example 1. A method performed by a processor of a base station of managing control signaling for multicast communications, including transmitting to a wireless device an indication of whether to monitor a group common physical downlink control channel (GC PDCCH), a wireless device-specific PDCCH, or both the GC PDCCH and the wireless device-specific PDCCH for multicast configuration information, determining a schedule for transmitting multicast communications to the wireless device based on a capability reported by the wireless device, transmitting to the wireless device an indication of whether a transport block for group common multicast communications including the services for multicast will be scheduled by the GC PDCCH, the wireless device-specific PDCCH, or both the GC PDCCH and the wireless device-specific PDCCH, and transmitting to the wireless device the multicast communications according to the multicast configuration information and the schedule.

Example 2. The method of example 1, in which transmitting to the wireless device an indication of whether to monitor the GC PDCCH, the wireless device-specific PDCCH, or both the GC PDCCH and the wireless device-specific PDCCH for multicast configuration information includes transmitting to the wireless device a Control Resource Set (CORESET) configuration indicating whether to enable monitoring of the GC PDCCH, the wireless device-specific PDCCH, or both the GC PDCCH and the wireless device-specific PDCCH.

Example 3. The method of either of examples 1 or 2, in which transmitting to the wireless device an indication of whether to monitor the GC PDCCH, the wireless device-specific PDCCH, or both the GC PDCCH and the wireless device-specific PDCCH for multicast configuration information includes transmitting to the wireless device a Search Space (SS) configuration indicating whether to enable monitoring of the GC PDCCH, the wireless device-specific PDCCH, or both the GC PDCCH and the wireless device-specific PDCCH.

Example 4. The method of any of examples 1-3, in which transmitting to the wireless device an SS configuration indicating whether to enable monitoring of the GC PDCCH, the wireless device-specific PDCCH, or both the GC PDCCH and the wireless device-specific PDCCH includes transmitting to the wireless device a common SS configuration indicating whether to enable monitoring of the GC PDCCH, the wireless device-specific PDCCH, or both the GC PDCCH and the wireless device-specific PDCCH.

Example 5. The method of example 3, in which transmitting to the wireless device an SS configuration indicating whether to enable monitoring of the GC PDCCH, the wireless device-specific PDCCH, or both the GC PDCCH and the wireless device-specific PDCCH includes transmitting to the wireless device a wireless device-specific SS configuration indicating whether to enable monitoring of the GC PDCCH, the wireless device-specific PDCCH, or both the GC PDCCH and the wireless device-specific PDCCH.

Example 6. The method of any of examples 1-5, in which transmitting to the wireless device an indication of whether to monitor the GC PDCCH, the wireless device-specific PDCCH, or both the GC PDCCH and the wireless device-specific PDCCH for multicast configuration information includes transmitting to the wireless device a Downlink Control Information (DCI) format indicating whether to enable a Radio Network Temporary Identifier (RNTI) associated with the GC PDCCH, an RNTI associated with the wireless device-specific PDCCH, or both the RNTI associated with the GC PDCCH and the RNTI associated with the wireless device-specific PDCCH.

Example 7. The method of any of examples 1-6, in which transmitting to the wireless device an indication of whether to monitor the GC PDCCH, the wireless device-specific PDCCH, or both the GC PDCCH and the wireless device-specific PDCCH for multicast configuration information includes transmitting to the wireless device a Channel Quality Indicator (CQI) threshold or a Signal-Plus-Interference-to-Noise Ratio (SINR) threshold to enable the wireless device to determine whether to monitor the GC PDCCH or the wireless device-specific PDCCH.

Example 8. The method of example 7, in which transmitting to the wireless device a CQI threshold or a SINR threshold to enable the wireless device to determine whether to monitor the GC PDCCH or the wireless device-specific PDCCH includes transmitting to the wireless device the CQI threshold or the SINR threshold to enable the wireless device to determine whether to enable an RNTI associated with the GC PDCCH or an RNTI associated with the wireless device-specific PDCCH.

Example 9. The method of any of examples 1-8, in which transmitting to the wireless device an indication of whether to monitor the GC PDCCH, the wireless device-specific PDCCH, or both the GC PDCCH and the wireless device-specific PDCCH for multicast configuration information includes transmitting to the wireless device a priority index to enable the wireless device to determine whether to monitor the GC PDCCH or the wireless device-specific PDCCH.

Example 10. The method of any of examples 1-9, in which transmitting to the wireless device an indication of whether a transport block for GC multicast communications including services for multicast communications-will be scheduled by the GC PDCCH, the wireless device-specific PDCCH, or both the GC PDCCH and the wireless device-specific PDCCH includes transmitting the schedule to the wireless device by Radio Resource Control (RRC) signaling.

Example 11. The method of example 10, in which determining a schedule for transmitting multicast communications to the wireless device based on a capability reported by the wireless device includes determining based on the capability reported by the wireless device whether the wireless device is capable of receiving the schedule via the GC PDCCH, the wireless device-specific PDCCH, or both the GC PDCCH and the wireless device-specific PDCCH.

Example 12. The method of example 10, in which determining based on the capability reported by the wireless device whether the wireless device is capable of receiving the schedule via the GC PDCCH, the wireless device-specific PDCCH, or both the GC PDCCH and the wireless device-specific PDCCH includes determining based on the capability reported by the wireless device whether the wireless device is capable of receiving multicast communications via the GC PDCCH or the wireless device-specific PDCCH in a same slot or overlapping in time.

Example 13. The method of example 10, in which transmitting to the wireless device an indication of whether a transport block for GC multicast communications including services for multicast communications will be scheduled by the GC PDCCH, the wireless device-specific PDCCH, or both the GC PDCCH and the wireless device-specific PDCCH includes transmitting to the wireless device a wireless device-specific PDCCH including a field to indicate whether the wireless device-specific PDCCH is associated with the GC PDCCH for multicast transmission.

Example 14. The method of example 10, in which transmitting to the wireless device an indication of whether a transport block for GC multicast communications including services for multicast communications-will be scheduled by the GC PDCCH, the wireless device-specific PDCCH, or both the GC PDCCH and the wireless device-specific PDCCH includes transmitting to the wireless device an indication that the wireless device-specific PDCCH includes a same Hybrid Automatic Retransmission Request (HARQ) process ID and a same New Data Indicator (NDI) as an associated GC PDCCH for multicast transmission.

Example 15. The method of example 10, further including in response to determining that the wireless device is capable of receiving the multicast scheduling information via both the GC PDCCH and the wireless device-specific PDCCH, transmitting to the wireless device an indication of whether multicast communications sent via a first physical downlink shared channel (PDSCH) that is scheduled by the wireless device-specific PDCCH and multicast communications sent via a second PDSCH that is scheduled by the GC PDCCH use the same resources and configuration.

Example 16. The method of example 15, in which transmitting to the wireless device an indication of whether multicast communications sent via the first PDSCH and multicast communications sent via the second PDSCH use the same resources and configuration includes transmitting to the wireless device an indication of whether multicast communications sent via the first PDSCH and multicast communications sent via the second PDSCH are transmitted in a same transport block (TB), in which the multicast communications sent via the first PDSCH and the multicast communications sent via the second PDSCH have different redundancy versions (RVs).

Example 17. The method of example 15, further including receiving feedback from the wireless device via an uplink resource indicated in the wireless device-specific PDCCH.

Example 18. The method of example 15, further including sending a retransmission of the multicast communications via the first PDSCH.

Example 19. The method of any of examples 1-18, further including determining a PDCCH scheduling limitation on a number of GC PDCCHs, wireless device-specific PDCCHs, or GC PDCCHs and device-specific PDCCHs that may be scheduled in a same slot, in which transmitting to the wireless device the multicast communications according to the multicast configuration information and the schedule includes transmitting to the wireless device the multicast communications according to the determined PDCCH scheduling limitation.

Example 20. The method of any of examples 1-19, further including determining a PDSCH scheduling limitation on a number of PDSCHs scheduled by a GC PDCCH, PDSCHs scheduled by a wireless device-specific PDCCH, or PDSCHs scheduled by a GC PDCCH and a wireless device-specific PDCCH that may be scheduled in a same slot, in which transmitting to the wireless device the multicast communications according to the multicast configuration information and the schedule includes transmitting to the wireless device the multicast communications according to the determined PDSCH scheduling limitation.

Example 21. The method of any of examples 1-20, further including determining a TB scheduling limitation on a maximum data rate of TBs per slot transmitted in PDSCHs scheduled by a GC PDCCH, TBs per slot transmitted in PDSCHs scheduled by a wireless device-specific PDCCH, or TBs per slot transmitted in PDSCHs scheduled by a GC PDCCH(s) and wireless device-specific PDCCH(s) that may be scheduled in a same slot, in which transmitting to the wireless device the multicast communications according to the multicast configuration information and the schedule includes transmitting to the wireless device the multicast communications according to the determined TB scheduling limitation.

Example 22. A method performed by a processor of a wireless device of managing control signaling for multicast communications, including receiving from a base station an indication of whether to monitor a group common physical downlink control channel (GC PDCCH), a wireless device-specific PDCCH, or both the GC PDCCH and the wireless device-specific PDCCH for multicast configuration information, transmitting to the base station a capability of the wireless device to receive a schedule for multicast communication, receiving from the base station an indication of whether a transport block for GC multicast communications including services for multicast communications—will be scheduled by the GC PDCCH, the wireless device-specific PDCCH, or both the GC PDCCH and the wireless device-specific PDCCH, based on the capability of the wireless device, and receiving from the base station the multicast communications according to the multicast configuration information and the schedule.

Example 23. The method of example 22, in which receiving from the base station an indication of whether to monitor the GC PDCCH, the wireless device-specific PDCCH, or both the GC PDCCH and the wireless device-specific PDCCH for multicast configuration information includes receiving from the base station a Control Resource Set (CORESET) configuration indicating whether to enable monitor the GC PDCCH, the wireless device-specific PDCCH, or both the GC PDCCH and the wireless device-specific PDCCH.

Example 24. The method of either of examples 22 or 23, in which receiving from the base station an indication of whether to monitor the GC PDCCH, the wireless device-specific PDCCH, or both the GC PDCCH and the wireless device-specific PDCCH for multicast configuration information includes receiving from the base station a Search Space (SS) configuration indicating whether to enable monitoring of the GC PDCCH, the wireless device-specific PDCCH, or both the GC PDCCH and the wireless device-specific PDCCH.

Example 25. The method of example 24, in which receiving from the base station a, SS configuration indicating whether to enable monitoring of the GC PDCCH, the wireless device-specific PDCCH, or both the GC PDCCH and the wireless device-specific PDCCH includes receiving from the base station a common SS configuration indicating whether to enable monitoring of the GC PDCCH, the wireless device-specific PDCCH, or both the GC PDCCH and the wireless device-specific PDCCH.

Example 26. The method of example 24, in which receiving from the base station a, SS configuration indicating whether to enable monitoring of the GC PDCCH, the wireless device-specific PDCCH, or both the GC PDCCH and the wireless device-specific PDCCH includes receiving from the base station a wireless device-specific SS configuration indicating whether to enable monitoring of the GC PDCCH, the wireless device-specific PDCCH, or both the GC PDCCH and the wireless device-specific PDCCH.

Example 27. The method of example 24, in which receiving from the base station an indication of whether to monitor the GC PDCCH, the wireless device-specific PDCCH, or both the GC PDCCH and the wireless device-specific PDCCH for multicast configuration information includes receiving from the base station a Downlink Control Information (DCI) format indicating whether to enable a Radio Network Temporary Identifier (RNTI) associated with the GC PDCCH, an RNTI associated with the wireless device-specific PDCCH, or both the RNTI associated with the GC PDCCH and the RNTI associated with the wireless device-specific PDCCH.

Example 28. The method of any of examples 22-27, in which receiving from the base station an indication of whether to monitor the GC PDCCH, the wireless device-specific PDCCH, or both the GC PDCCH and the wireless device-specific PDCCH for multicast configuration information includes receiving from the base station a Channel Quality Indicator (CQI) threshold or a Signal-Plus-Interference-to-Noise Ratio (SINR) threshold, determining whether a CQI of a signal from the base station exceeds the CQI threshold or a SINR of a signal from the base station exceeds the SINR threshold, monitoring the GC PDCCH in response to determining that the CQI of the signal from the base station exceeds the CQI threshold or the SINR of the signal from the base station exceeds the SINR threshold, and monitoring the wireless device-specific PDCCH in response to determining that the CQI of the signal from the base station does not exceed the CQI threshold or the SINR of the signal from the base station does not exceed the SINR threshold.

Example 29. The method of example 28, in which monitoring the GC PDCCH includes enabling an RNTI associated with the GC PDCCH, and monitoring the wireless device-specific PDCCH includes enabling an RNTI associated with the wireless device-specific PDCCH.

Example 30. The method of any of examples 22-29, in which receiving from the base station an indication of whether to monitor the GC PDCCH, the wireless device-specific PDCCH, or both the GC PDCCH and the wireless device-specific PDCCH for multicast configuration information includes receiving from the base station a priority index, and determining based on the priority index and a priority associated with the GC PDCCH or the wireless device-specific PDCCH whether to monitor the GC PDCCH or the wireless device-specific PDCCH.

Example 31. The method of any of examples 22-29, in which receiving from the base station an indication of whether to monitor the GC PDCCH, the wireless device-specific PDCCH, or both the GC PDCCH and the wireless device-specific PDCCH for multicast configuration information includes receiving from the base station a wireless device-specific PDCCH including a field indicating whether the wireless device-specific PDCCH is associated with the GC PDCCH for multicast transmission.

Example 32. The method of any of examples 22-29, in which receiving from the base station an indication of whether to monitor the GC PDCCH, the wireless device-specific PDCCH, or both the GC PDCCH and the wireless device-specific PDCCH for multicast configuration information includes receiving from the base station an indication that the wireless device-specific PDCCH includes a same Hybrid Automatic Retransmission Request (HARQ) process ID and a same New Data Indicator (NDI) as an associated GC PDCCH for multicast transmission.

Example 33. The method of any of examples 22-32, further including receiving from the base station an indication of whether multicast communications sent via a first physical downlink shared channel (PDSCH) that is scheduled by the wireless device-specific PDCCH and multicast communications sent via a second PDSCH that is scheduled by the GC PDCCH use the same resources and configuration.

Example 34. The method of example 33, in which receiving from the base station an indication of whether multicast communications sent via the first PDSCH and multicast communications sent via a second PDSCH use the same resources and configuration includes receiving from the base station an indication of whether multicast communications sent via the first PDSCH and multicast communications sent via the second PDSCH are transmitted in a same transport block (TB), in which the multicast communications sent via the first PDSCH and the multicast communications sent via the second PDSCH have different redundancy versions (RVs).

Example 35. The method of example 33, further including sending feedback to the base station via an uplink resource indicated in the wireless device-specific PDCCH.

Example 36. The method of example 33, further including receiving a retransmission of the multicast communications via the first PDSCH.

Example 37. The method of any of examples 22-36, in which receiving from the base station the multicast communications according to the multicast configuration information and the schedule includes receiving from the base station the multicast communications according to a PDCCH limitation on a number of GC PDCCHs, wireless device-specific PDCCHs, or GC PDCCHs and device-specific PDCCHs that may be scheduled in a same slot, in which the PDCCH limitation is based on the capability of the wireless device.

Example 38. The method of any of examples 22-37, in which receiving from the base station the multicast communications according to the multicast configuration information and the schedule includes receiving from the base station the multicast communications according to a PDSCH scheduling limitation on a number of PDSCHs scheduled by a GC PDCCH, PDSCHs scheduled by a wireless device-specific PDCCH, or PDSCHs scheduled by a GC PDCCH(s) and wireless device-specific PDCCHs that may be scheduled in a same slot, in which the PDSCH scheduling limitation is based on the capability of the wireless device.

Example 39. The method of any of examples 22-38, in which receiving from the base station the multicast communications according to the multicast configuration information and the schedule includes receiving from the base station the multicast communications according to a TB scheduling limitation on a number of TBs transmitted in PDSCHs scheduled by a GC PDCCH, TBs transmitted in PDSCHs scheduled by a wireless device-specific PDCCH, or TBs transmitted in PDSCHs scheduled by a GC PDCCH(s) and wireless device-specific PDCCH(s) that may be scheduled in a same slot, in which the TB scheduling limitation is based on the capability of the wireless device.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a base station of managing control signaling for multicast communications, comprising:
    transmitting to a wireless device an indication of whether to monitor a group common physical downlink control channel (GC PDCCH), a wireless device-specific PDCCH, or both the GC PDCCH and the wireless device-specific PDCCH for multicast configuration information;
    transmitting to the wireless device a Channel Quality Indicator (CQI) threshold or a Signal-Plus-Interference-to-Noise Ratio (SINR) threshold that enables the wireless device to determine whether to enable an Radio Network Temporary Identifier (RNTI) associated with the GC PDCCH or an RNTI associated with the wireless device-specific PDCCH;
    determining a schedule for transmitting multicast communications to the wireless device based on a capability reported by the wireless device;
    transmitting to the wireless device an indication of whether a transport block for GC multicast communications including services for multicast communications will be scheduled by the GC PDCCH, the wireless device-specific PDCCH, or both the GC PDCCH and the wireless device-specific PDCCH; and
    transmitting to the wireless device the multicast communications according to the multicast configuration information and the schedule.

2. The method of claim 1, wherein transmitting to the wireless device an indication of whether to monitor the GC PDCCH, the wireless device-specific PDCCH, or both the GC PDCCH and the wireless device-specific PDCCH for multicast configuration information comprises transmitting to the wireless device a Control Resource Set (CORESET) configuration indicating whether to enable monitoring of the GC PDCCH, the wireless device-specific PDCCH, or both the GC PDCCH and the wireless device-specific PDCCH.

3. The method of claim 1, wherein transmitting to the wireless device an indication of whether to monitor the GC PDCCH, the wireless device-specific PDCCH, or both the GC PDCCH and the wireless device-specific PDCCH for multicast configuration information comprises transmitting to the wireless device a Search Space (SS) configuration indicating whether to enable monitoring of the GC PDCCH, the wireless device-specific PDCCH, or both the GC PDCCH and the wireless device-specific PDCCH.

4. The method of claim 3, wherein transmitting to the wireless device an SS configuration indicating whether to enable monitoring of the GC PDCCH, the wireless device-specific PDCCH, or both the GC PDCCH and the wireless device-specific PDCCH comprises transmitting to the wireless device a common SS configuration indicating whether to enable monitoring of the GC PDCCH, the wireless device-specific PDCCH, or both the GC PDCCH and the wireless device-specific PDCCH.

5. The method of claim 3, wherein transmitting to the wireless device an SS configuration indicating whether to enable monitoring of the GC PDCCH, the wireless device-specific PDCCH, or both the GC PDCCH and the wireless device-specific PDCCH comprises transmitting to the wireless device a wireless device-specific SS configuration indicating whether to enable monitoring of the GC PDCCH, the wireless device-specific PDCCH, or both the GC PDCCH and the wireless device-specific PDCCH.

6. The method of claim 1, wherein transmitting to the wireless device an indication of whether to monitor the GC PDCCH, the wireless device-specific PDCCH, or both the GC PDCCH and the wireless device-specific PDCCH for multicast configuration information comprises transmitting to the wireless device a Downlink Control Information (DCI) format indicating whether to enable an RNTI associated with the GC PDCCH, an RNTI associated with the wireless device-specific PDCCH, or both the RNTI associated with the GC PDCCH and the RNTI associated with the wireless device-specific PDCCH.

7. The method of claim 1, wherein transmitting to the wireless device an indication of whether to monitor the GC PDCCH, the wireless device-specific PDCCH, or both the GC PDCCH and the wireless device-specific PDCCH for multicast configuration information comprises transmitting to the wireless device a priority index to enable the wireless device to determine whether to monitor the GC PDCCH or the wireless device-specific PDCCH.

8. The method of claim 1, wherein transmitting to the wireless device an indication of whether a transport block for GC multicast communications including services for multicast communications will be scheduled by the GC PDCCH, the wireless device-specific PDCCH, or both the GC PDCCH and the wireless device-specific PDCCH comprises transmitting the schedule to the wireless device by Radio Resource Control (RRC) signaling.

9. The method of claim 8, wherein determining a schedule for transmitting multicast communications to the wireless device based on a capability reported by the wireless device comprises determining based on the capability reported by the wireless device whether the wireless device is capable of receiving the schedule via the GC PDCCH, the wireless device-specific PDCCH, or both the GC PDCCH and the wireless device-specific PDCCH.

10. The method of claim 8, wherein determining based on the capability reported by the wireless device whether the wireless device is capable of receiving the schedule via the GC PDCCH, the wireless device-specific PDCCH, or both the GC PDCCH and the wireless device-specific PDCCH comprises determining based on the capability reported by the wireless device whether the wireless device is capable of receiving multicast communications via the GC PDCCH or the wireless device-specific PDCCH in a same slot or overlapping in time.

11. The method of claim 8, wherein transmitting to the wireless device an indication of whether a transport block for GC multicast communications including services for multicast communications will be scheduled by the GC PDCCH, the wireless device-specific PDCCH, or both the GC PDCCH and the wireless device-specific PDCCH comprises transmitting to the wireless device a wireless device-specific PDCCH including a field to indicate whether the wireless device-specific PDCCH is associated with the GC PDCCH for multicast transmission, GC PDCCH.

12. The method of claim 8, wherein transmitting to the wireless device an indication of whether a transport block for GC multicast communications including services for multicast communications will be scheduled by the GC PDCCH, the wireless device-specific PDCCH, or both the GC PDCCH and the wireless device-specific PDCCH comprises transmitting to the wireless device an indication that the wireless device-specific PDCCH comprises a same Hybrid Automatic Retransmission Request (HARQ) process ID and a same New Data Indicator (NDI) as an associated GC PDCCH for multicast transmission.

13. The method of claim 8, further comprising:
in response to determining that the wireless device is capable of receiving the multicast scheduling information via both the GC PDCCH and the wireless device-specific PDCCH, transmitting to the wireless device an indication of whether multicast communications sent via a first physical downlink shared channel (PDSCH) that is scheduled by the wireless device-specific PDCCH and multicast communications sent via a second PDSCH that is scheduled by the GC PDCCH use the same resources and configuration.

14. The method of claim 13, wherein transmitting to the wireless device an indication of whether multicast communications sent via the first PDSCH and multicast communications sent via the second PDSCH use the same resources and configuration comprises:
transmitting to the wireless device an indication of whether multicast communications sent via the first PDSCH and multicast communications sent via the second PDSCH are transmitted in a same transport block (TB), wherein the multicast communications sent via the first PDSCH and the multicast communications sent via the second PDSCH have different redundancy versions (RVs).

15. The method of claim 13, further comprising receiving feedback from the wireless device via an uplink resource indicated in the wireless device-specific PDCCH.

16. The method of claim 13, further comprising sending a retransmission of the multicast communications via the first PDSCH.

17. The method of claim 1, further comprising:
determining a PDCCH scheduling limitation on a number of GC PDCCHs, wireless device-specific PDCCHs, or GC PDCCHs and device-specific PDCCHs that may be scheduled in a same slot,
wherein transmitting to the wireless device the multicast communications according to the multicast configuration information and the schedule comprises transmitting to the wireless device the multicast communications according to the determined PDCCH scheduling limitation.

18. The method of claim 1, further comprising:
determining a PDSCH scheduling limitation on a number of PDSCHs scheduled by a GC PDCCH, PDSCHs scheduled by a wireless device-specific PDCCH, or PDSCHs scheduled by a GC PDCCH and a wireless device-specific PDCCH that may be scheduled in a same slot,
wherein transmitting to the wireless device the multicast communications according to the multicast configuration information and the schedule comprises transmitting to the wireless device the multicast communications according to the determined PDSCH scheduling limitation.

19. The method of claim 1, further comprising:
determining a TB scheduling limitation on a maximum data rate of TBs per slot transmitted in PDSCHs scheduled by a GC PDCCH, TBs per slot transmitted in PDSCHs scheduled by a wireless device-specific PDCCH, or TBs per slot transmitted in PDSCHs scheduled by a GC PDCCH(s) and wireless device-specific PDCCH(s) that may be scheduled in a same slot,
wherein transmitting to the wireless device the multicast communications according to the multicast configuration information and the schedule comprises transmitting to the wireless device the multicast communications according to the determined TB scheduling limitation.

20. A method performed by a processor of a wireless device of managing control signaling for multicast communications, comprising:
receiving from a base station an indication of whether to monitor a group common physical downlink control channel (GC PDCCH), a wireless device-specific PDCCH, or both the GC PDCCH and the wireless device-specific PDCCH for multicast configuration information wherein the wireless device-specific PDCCH includes a field indicating whether the wireless device-specific PDCCH is associated with the GC PDCCH for multicast transmission;
transmitting to the base station a capability of the wireless device to receive a schedule for multicast communication;
receiving from the base station an indication of whether a transport block for GC multicast communications including services for multicast communications will be scheduled by the GC PDCCH, the wireless device-specific PDCCH, or both the GC PDCCH and the wireless device-specific PDCCH, based on the capability of the wireless device; and
receiving from the base station the multicast communications according to the multicast configuration information and the schedule.

21. The method of claim 20, wherein receiving from the base station an indication of whether to monitor the GC PDCCH, the wireless device-specific PDCCH, or both the GC PDCCH and the wireless device-specific PDCCH for multicast configuration information comprises receiving from the base station a Control Resource Set (CORESET) configuration indicating whether to enable monitor the GC PDCCH, the wireless device-specific PDCCH, or both the GC PDCCH and the wireless device-specific PDCCH.

22. The method of claim 20, wherein receiving from the base station an indication of whether to monitor the GC PDCCH, the wireless device-specific PDCCH, or both the GC PDCCH and the wireless device-specific PDCCH for multicast configuration information comprises receiving from the base station a Search Space (SS) configuration indicating whether to enable monitoring of the GC PDCCH, the wireless device-specific PDCCH, or both the GC PDCCH and the wireless device-specific PDCCH.

23. The method of claim 22, wherein receiving from the base station a, SS configuration indicating whether to enable monitoring of the GC PDCCH, the wireless device-specific PDCCH, or both the GC PDCCH and the wireless device-specific PDCCH comprises receiving from the base station a common SS configuration indicating whether to enable monitoring of the GC PDCCH, the wireless device-specific PDCCH, or both the GC PDCCH and the wireless device-specific PDCCH.

24. The method of claim 22, wherein receiving from the base station a SS configuration indicating whether to enable monitoring of the GC PDCCH, the wireless device-specific PDCCH, or both the GC PDCCH and the wireless device-specific PDCCH comprises receiving from the base station a wireless device-specific SS configuration indicating whether to enable monitoring of the GC PDCCH, the wireless device-specific PDCCH, or both the GC PDCCH and the wireless device-specific PDCCH.

25. The method of claim 22, wherein receiving from the base station an indication of whether to monitor the GC PDCCH, the wireless device-specific PDCCH, or both the GC PDCCH and the wireless device-specific PDCCH for multicast configuration information comprises receiving from the base station a Downlink Control Information (DCI) format indicating whether to enable a Radio Network Temporary Identifier (RNTI) associated with the GC PDCCH, an RNTI associated with the wireless device-specific PDCCH, or both the RNTI associated with the GC PDCCH and the RNTI associated with the wireless device-specific PDCCH.

26. The method of claim 25, wherein receiving from the base station an indication of whether to monitor the GC PDCCH, the wireless device-specific PDCCH, or both the GC PDCCH and the wireless device-specific PDCCH for multicast configuration information comprises:
receiving from the base station a Channel Quality Indicator (CQI) threshold or a Signal-Plus-Interference-to-Noise Ratio (SINR) threshold;
determining whether a CQI of a signal from the base station exceeds the CQI threshold or a SINR of a signal from the base station exceeds the SINR threshold;
monitoring the GC PDCCH in response to determining that the CQI of the signal from the base station exceeds the CQI threshold or the SINR of the signal from the base station exceeds the SINR threshold; and
monitoring the wireless device-specific PDCCH in response to determining that the CQI of the signal from the base station does not exceed the CQI threshold or the SINR of the signal from the base station does not exceed the SINR threshold.

27. The method of claim 26, wherein:
monitoring the GC PDCCH comprises enabling an RNTI associated with the GC PDCCH; and
monitoring the wireless device-specific PDCCH comprises enabling an RNTI associated with the wireless device-specific PDCCH.

28. The method of claim 20, wherein receiving from the base station an indication of whether to monitor the GC PDCCH, the wireless device-specific PDCCH, or both the GC PDCCH and the wireless device-specific PDCCH for multicast configuration information comprises:
receiving from the base station a priority index; and
determining based on the priority index and a priority associated with the GC PDCCH or the wireless device-specific PDCCH whether to monitor the GC PDCCH or the wireless device-specific PDCCH.

29. The method of claim 20, wherein receiving from the base station an indication of whether to monitor the GC PDCCH, the wireless device-specific PDCCH, or both the GC PDCCH and the wireless device-specific PDCCH for multicast configuration information comprises receiving from the base station an indication that the wireless device-specific PDCCH comprises a same Hybrid Automatic Retransmission Request (HARQ) process ID and a same New Data Indicator (NDI) as an associated GC PDCCH for multicast transmission.

30. The method of claim 20, further comprising:
receiving from the base station an indication of whether multicast communications sent via a first physical downlink shared channel (PDSCH) that is scheduled by the wireless device-specific PDCCH and multicast communications sent via a second PDSCH that is scheduled by the GC PDCCH use the same resources and configuration.

31. The method of claim 30, wherein receiving from the base station an indication of whether multicast communications sent via the first PDSCH and multicast communications sent via a second PDSCH use the same resources and configuration comprises:
receiving from the base station an indication of whether multicast communications sent via the first PDSCH and multicast communications sent via the second PDSCH are transmitted in a same transport block (TB), wherein the multicast communications sent via the first PDSCH and the multicast communications sent via the second PDSCH have different redundancy versions (RVs).

32. The method of claim 30, further comprising sending feedback to the base station via an uplink resource indicated in the wireless device-specific PDCCH.

33. The method of claim 30, further comprising receiving a retransmission of the multicast communications via the first PDSCH.

34. The method of claim 20, wherein receiving from the base station the multicast communications according to the multicast configuration information and the schedule comprises receiving from the base station the multicast communications according to a PDCCH limitation on a number of GC PDCCHs, wireless device-specific PDCCHs, or GC PDCCHs and device-specific PDCCHs that may be scheduled in a same slot, wherein the PDCCH limitation is based on the capability of the wireless device.

35. The method of claim 20, wherein receiving from the base station the multicast communications according to the multicast configuration information and the schedule comprises receiving from the base station the multicast communications according to a PDSCH scheduling limitation on a number of PDSCHs scheduled by a GC PDCCH, PDSCHs scheduled by a wireless device-specific PDCCH, or PDSCHs scheduled by a GC PDCCH(s) and wireless device-specific PDCCHs that may be scheduled in a same slot, wherein the PDSCH scheduling limitation is based on the capability of the wireless device.

36. The method of claim 20, wherein receiving from the base station the multicast communications according to the multicast configuration information and the schedule comprises receiving from the base station the multicast communications according to a TB scheduling limitation on a maximum data rate of TB s per slot transmitted in PDSCHs scheduled by a GC PDCCH, TBs per slot transmitted in PDSCHs scheduled by a wireless device-specific PDCCH, or TBs per slot transmitted in PDSCHs scheduled by a GC PDCCH(s) and wireless device-specific PDCCH(s) that may be scheduled in a same slot, wherein the TB scheduling limitation is based on the capability of the wireless device.

37. A base station, comprising:
a transceiver; and
a processor coupled to the transceiver and configured to:
transmit to a wireless device an indication of whether to monitor a group common physical downlink control channel (GC PDCCH), a wireless device-specific PDCCH, or both the GC PDCCH and the wireless device-specific PDCCH for multicast configuration information;
transmit to the wireless device a Channel Quality Indicator (CQI) threshold or a Signal-Plus-Interference-to-Noise Ratio (SINR) threshold that enables the wireless device to determine whether to enable an Radio Network Temporary Identifier (RNTI) associated with the GC PDCCH or an RNTI associated with the wireless device-specific PDCCH;
determine a schedule for transmitting multicast communications to the wireless device based on a capability reported by the wireless device;

transmit to the wireless device an indication of whether a transport block for GC multicast communications including services for multicast communications will be scheduled by the GC PDCCH, the wireless device-specific PDCCH, or both the GC PDCCH and the wireless device-specific PDCCH; and transmit to the wireless device the multicast communications according to the multicast configuration information and the schedule.

38. A wireless device, comprising:
a transceiver; and
a processor coupled to the transceiver and configured to:
receive from a base station an indication of whether to monitor a group common physical downlink control channel (GC PDCCH), a wireless device-specific PDCCH, or both the GC PDCCH and the wireless device-specific PDCCH for multicast configuration information, wherein the wireless device-specific PDCCH includes a field indicating whether the wireless device-specific PDCCH is associated with the GC PDCCH for multicast transmission;

transmit to the base station a capability of the wireless device to receive a schedule for multicast communication;

receive from the base station an indication of whether a transport block for GC multicast communications including services for multicast communications will be scheduled by the GC PDCCH, the wireless device-specific PDCCH, or both the GC PDCCH and the wireless device-specific PDCCH, based on the capability of the wireless device; and receive from the base station the multicast communications according to the multicast configuration information and the schedule.

* * * * *